(12) United States Patent
Ersoy

(10) Patent No.: US 12,298,715 B2
(45) Date of Patent: May 13, 2025

(54) TOTAGRAPHY: COHERENT DIFFRACTIVE/DIGITAL INFORMATION RECONSTRUCTION BY ITERATIVE PHASE RECOVERY USING A SECOND CAMERA IMAGING THE INPUT PLANE

(71) Applicant: Gerchberg Ophthalmic Dispensing, PLLC, New York, NY (US)

(72) Inventor: Okan Ersoy, West Lafayette, IN (US)

(73) Assignee: Wavefront Analysis Systems LLC, New York, NY (US)

( * ) Notice: Subject to any disclaimer, the term of this patent is extended or adjusted under 35 U.S.C. 154(b) by 678 days.

(21) Appl. No.: 17/587,561

(22) Filed: Jan. 28, 2022

(65) Prior Publication Data
US 2023/0280692 A1    Sep. 7, 2023

(51) Int. Cl.
G03H 1/08    (2006.01)
G03H 1/04    (2006.01)
G03H 1/16    (2006.01)

(52) U.S. Cl.
CPC ......... G03H 1/0808 (2013.01); G03H 1/0443 (2013.01); G03H 1/16 (2013.01); G03H 2001/0816 (2013.01); G03H 2223/13 (2013.01); G03H 2223/19 (2013.01); G03H 2240/51 (2013.01)

(58) Field of Classification Search
None
See application file for complete search history.

(56) References Cited

U.S. PATENT DOCUMENTS

| | | | |
|---|---|---|---|
| 6,369,932 B1 * | 4/2002 | Gerchberg | G02B 27/46 |
| | | | 359/279 |
| 11,237,059 B1 * | 2/2022 | Ersoy | G03H 1/0465 |
| 12,031,868 B2 * | 7/2024 | Ersoy | G03H 1/0465 |
| 2020/0249095 A1 * | 8/2020 | Milster | G01J 9/02 |
| 2021/0181673 A1 * | 6/2021 | Ozcan | G01N 15/1434 |

\* cited by examiner

Primary Examiner — Derek S. Chapel
(74) Attorney, Agent, or Firm — Riverside Law LLP

(57) ABSTRACT

A totagram is produced by an iterative spectral phase recovery process resulting in complete information recovery using special masks and using a reference beam. Using these special masking systems reduce computation time, number of masks, and number of iterations. Adding a reference wave to the iterative process provides better phase recovery systems and aid in the preventing of phase wrapping. The reference wave is added on-axis to provide a well-controlled amplitude. The reference wave is added after the physical or digital transformation system and subtracted before recording the initial amplitude. An additional camera at the input plane records the amplitudes of the original input wave which are used during the iterative process.

25 Claims, 22 Drawing Sheets

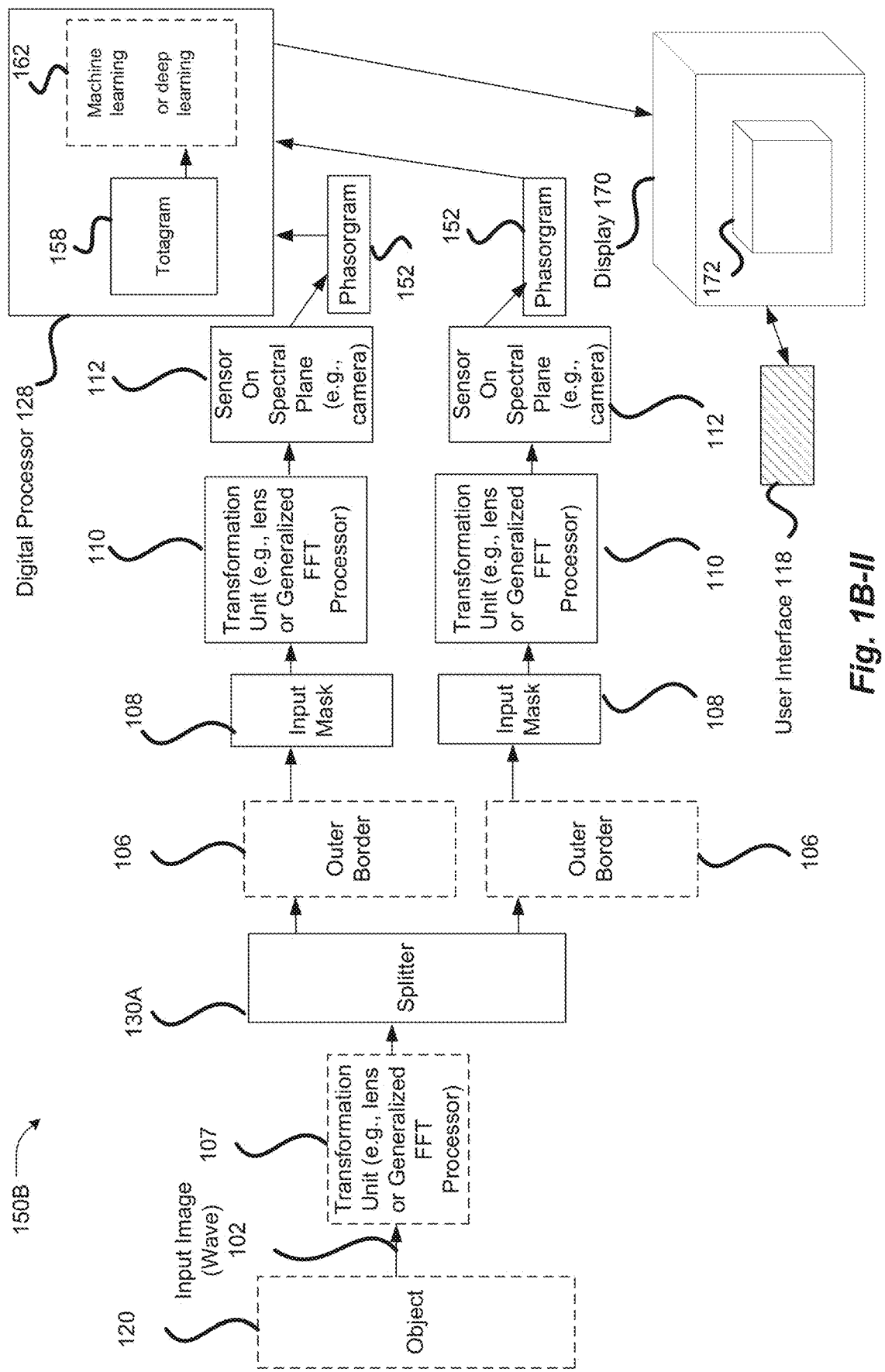
Fig. 1B-II

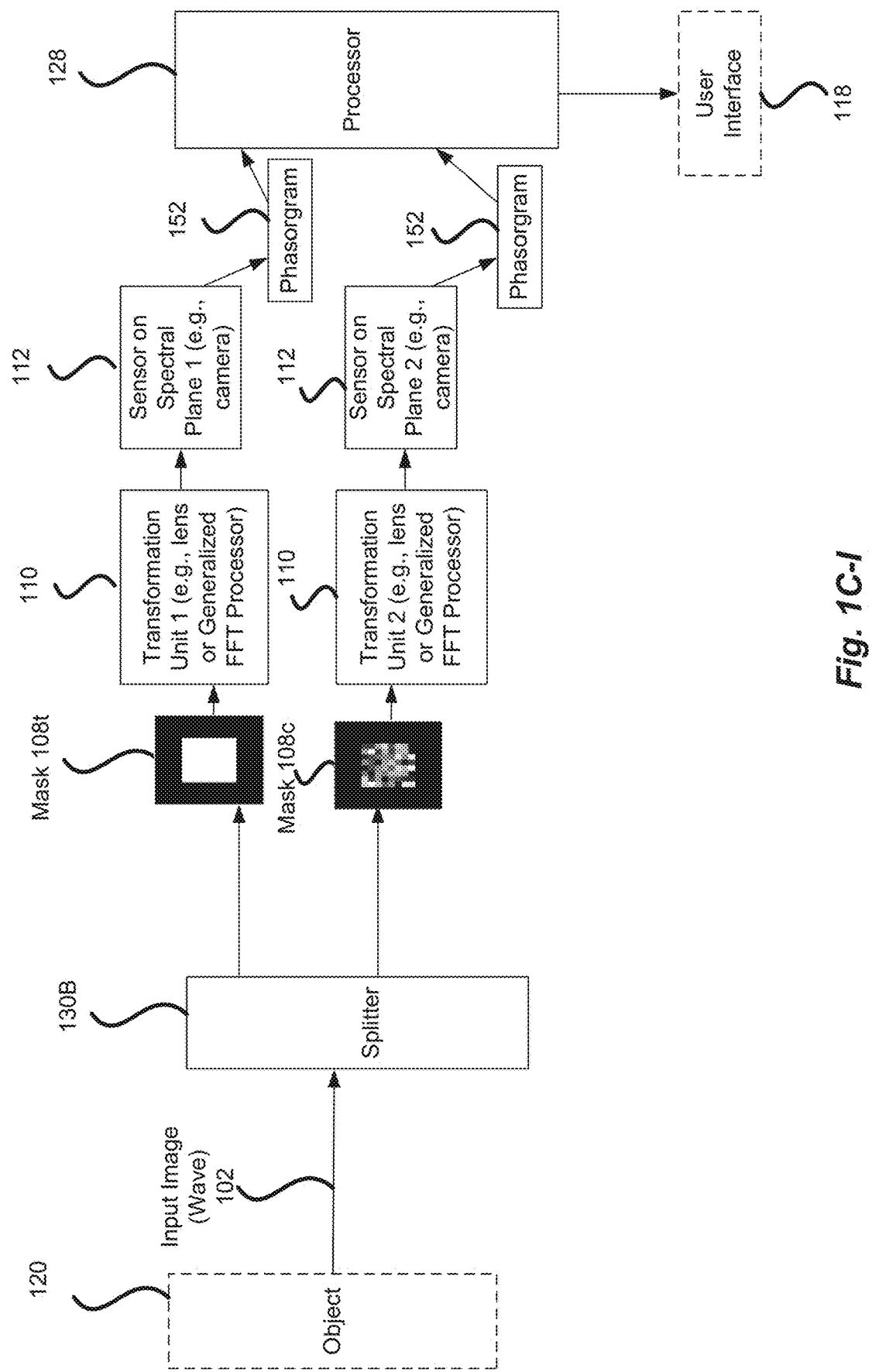
Fig. 1C-I

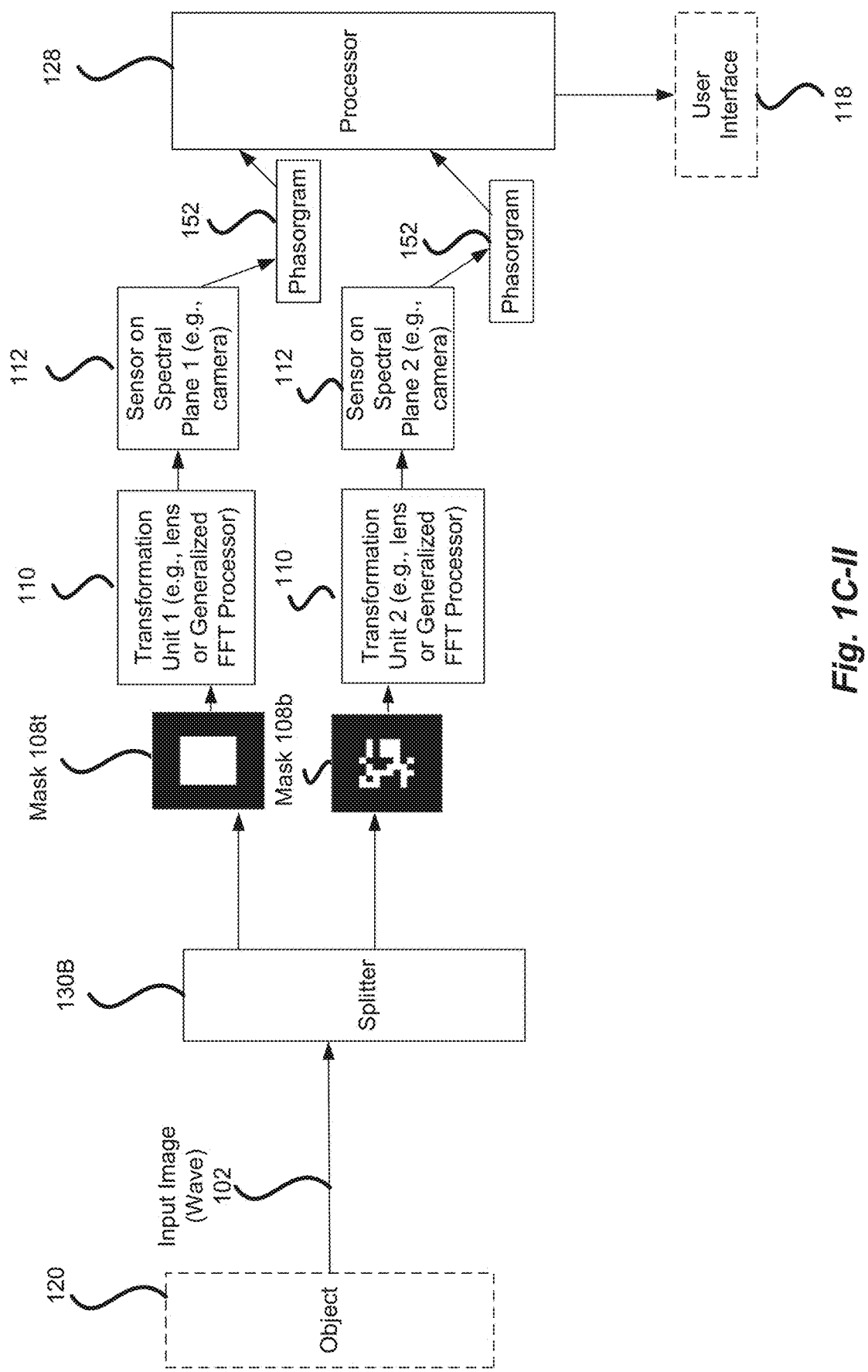
Fig. 1C-II

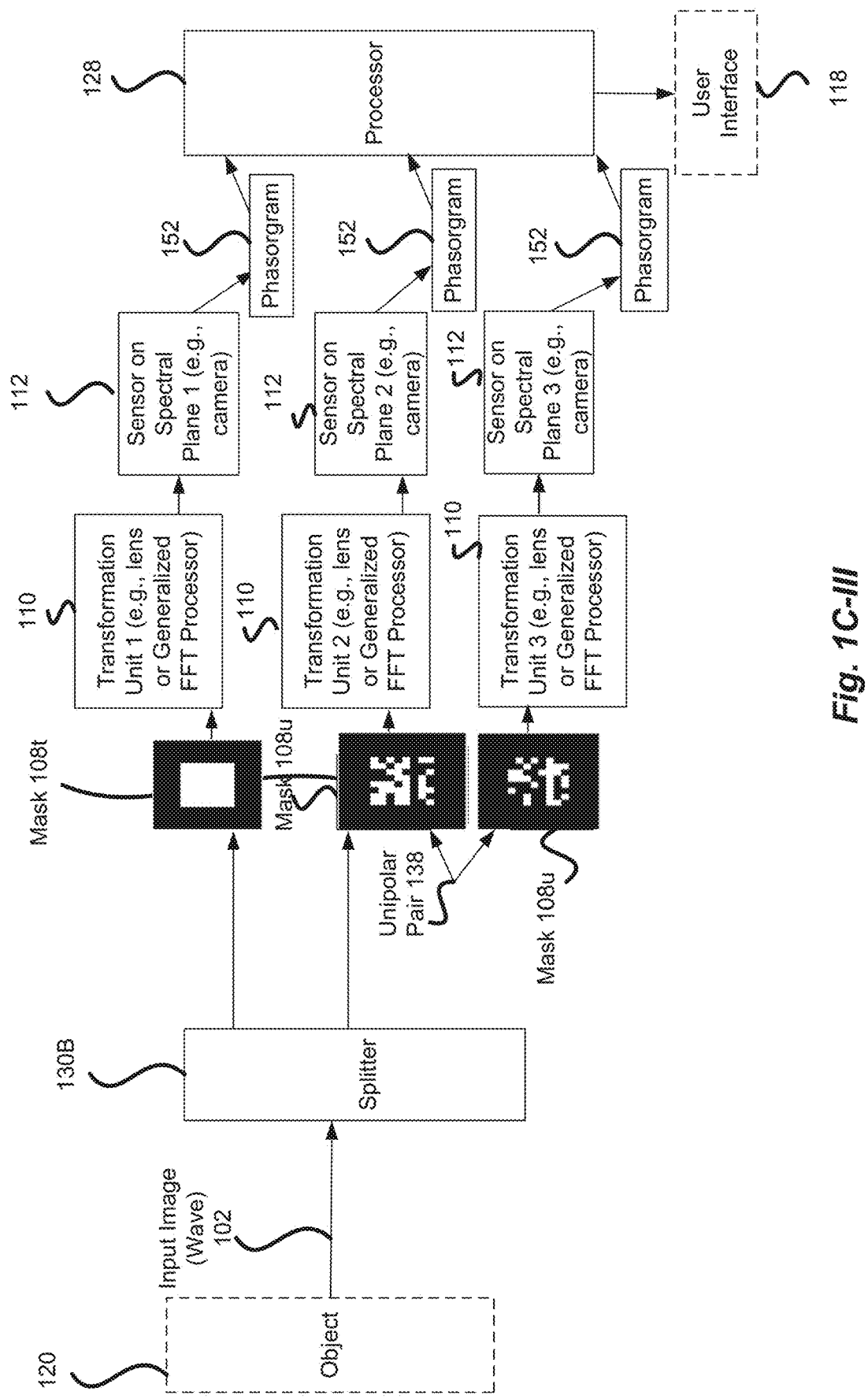
Fig. 1C-III

TOTAGRAPHY: COHERENT DIFFRACTIVE/DIGITAL INFORMATION RECONSTRUCTION BY ITERATIVE PHASE RECOVERY USING A SECOND CAMERA IMAGING THE INPUT PLANE

TECHNICAL FIELD

The present invention relates to phase recovery systems and methods. In particular, amplitude and phase are reconstituted for a coherent wave after measuring its amplitude at a spectral output. This case relates to U.S. patent application Ser. No. 17/120,919, filed Dec. 14, 2020, and U.S. patent application Ser. No. 17/545,371, filed Dec. 8, 2021, both of which are incorporated by reference herein in their entireties.

BACKGROUND ART

Information embedded in terms of amplitude and phase as in coherent wave representations leads to applications which are 1 or higher dimensional as in imaging. In such systems, phase is often more important than amplitude. In many coherent systems, phase is lost because what is measurable is intensity which is proportional to the square of the amplitude. Phase might also be intentionally lost. Phase recovery is also important with one-dimensional signals in a number of applications such as speech recognition, blind channel estimation, and blind deconvolution. The phase problem goes back to Rayleigh who wrote about it in 1892. Phase recovery has been a celebrated problem in succeeding years, and this process has accelerated after the 1960's when the laser and other important sources of coherent radiation were discovered.

There are indirect ways to recover phase and thereby achieve complete information recovery, for example, in diffractive imaging resulting in 3-D information. Holography discovered by Dennis Gabor is one of them, and it achieves 3-D imaging by introducing a reference wave. This has a lot to do with modulation principles used in communications. Another way is closely related to the Gerchberg-Saxton algorithm (1971-72), also known as the original Gerchberg-Saxton algorithm, and referred to as "GSA" herein, which involves measurements on two related planes, the input plane and the output spectral plane. Advances in a number of areas in science and technology are related to the GSA published in 1972 [R. W. Gerchberg, W. O. Saxton, "A practical algorithm for the determination of the phase from image and diffraction plane pictures," Optik, Vol. 35, pp. 237-246, 1972].

R. W. Gerchberg later made an improvement to the GSA by introducing N independent measurement systems on two planes especially by using phase masks. This improvement is known herein as "Gerchberg's second method," or "G2." G2 was published in R. W. Gerchberg, "A New Approach to Phase Retrieval of a Wave Front," Journal of Modern Optics, 49:7, 1185-1196, 2002, incorporated by reference in its entirety herein. Further aspects of G2 are described in U.S. Pat. Nos. 6,369,932 B1; 6,545,790; and 8,040,595 all incorporated by reference in their entirety herein.

Unlike holography, G2 does not require a reference wave. Rather, G2 is similar to measuring a quantity of interest in N independent ways and then doing averaging between the results. The patents show how to achieve this in practice when using waves. G2 is believed to be the first such method using multiple measurements for reliable phase recovery. Some other well-known methods for phase recovery are the error reduction (ER) algorithm [, J, R, Fienup, 'Reconstruction of an object from its Fourier transform,' Optics Letters, Vol. 3, No 1, pp. 27-29, July 1978; J. R. Fienup, 'Phase retrieval algorithms, a comparison,' Applied Optics, Vol. 21, No. 15, pp. 2758-2769, 1 Aug., 1982], the averaged successive relaxations (ASR) [J. C. H. Spence, 'Diffractive (lensless) imaging,' Ch. 19, Science of Microscopy, edited by P. W. Hawkes, J. C. H. Spence, Springer, 2007], the hybrid projection reflections (HPR) [H. H. Bauschke, P. L. Combettes, D. Russell Luke, 'Hybrid projection-reflection method for phase retrieval,' J. Optical Soc. Am. A, Vol. 20, No. 6, pp. 1025-134 June 2003], relaxed averaged alternating reflections (RAAR) [D. Russell Luke, 'Relaxed averaged alternating reflections for diffraction imaging,' Inverse Problems, Vol. 21, pp. 37-50, 2005], oversampling smoothness (OSS) [J. A. Rodriguez, R. Xu, C.-C. Chen, Y. Zou, and J. Miao, 'Oversampling smoothness: an effective algorithm for phase retrieval of noisy diffraction intensities,' J. Applied Crystallography, Vol. 46, pp. 312-318, 2013] and difference maps (DM) [V. Elser, 'Solution of the crystallographic phase problem by iterated projections,' Acta Crystallography. Section A: Foundations Crystallography, Vol. 59, pp. 201-209, 2003]. There are a number of algorithms considerably more recent, utilizing more effective optimization methods such as SO2D and SO4D [Stefano Marchesini, 'Phase retrieval and saddle-point optimization,' J. Optical Soc. Am. A, Vol. 24, No. 10, pp. 3289-3296 October 2007]. A new benchmark study of many popular phase retrieval algorithms is discussed in PhasePack [R.Chandra, T.Goldstein, C.Studer, Phasepack: a phase retrieval library,' IEEE 13th international conference on sampling theory and applications, pp. 1-5, 2019]. In this work, averaging and masking with 8 bipolar binary masks at the system input is used with 12 iterative phase recovery methods in the same way as in G2.

The common theme in all these algorithms is to achieve best phase recovery by using prior information and constraints. Use of input masks leads to such prior information. Nonnegativity, support information, and amplitude information are also commonly used as prior information. Support information is especially important. This often means the (complex) image of size N×N is at the center of a window surrounded by zeros to make the total size 2N×2N. This is also important when using the fast Fourier transform (FFT) to approximate the continuous Fourier transform in digital implementations.

Experimental work indicates that there is usually not enough prior information with a single measurement of amplitudes in the Fourier domain for perfect phase and image recovery. In other words, the recovery results with given data may be better with some methods than others, but the recovery is usually not perfect, namely it is often approximate without additional information. Works involving multiple measurements by using input masks outlined above make up for this deficiency.

Recently, machine learning, and especially deep learning methods have been utilized, often for improving the results obtained with previous phase recovery methods. For example, two deep neural networks (DNNs) have been used together with the HIO method to improve the phase recovery results [ç. Işul, F. S. Oktem, and A. Koç, 'Deep iterative reconstruction for phase retrieval,' Applied Optics, Vol. 58, pp. 5422-5431, 2019].

First, a DNN is used iteratively with the HIO method to improve the reconstructions. Next, a second DNN is trained to remove the remaining artifacts.

There is a growing realization in the research community that multiple measurements are necessary if high quality phase and image recovery are required. Quite recently, a number of such methods have been published in the literature. Below a discussion is presented on some methods having multiple measurements with some similarity to Gerchberg's G2 method.

In the phaselift method by Candes et al. [E. J. Candes, Y. Eldar, T. Strohmer, V, Voroninski, 'Phase Retrieval via Matrix Completion,' preprint, August 2011; E. J. Candes, X. Li, M. Soltanolkotabi, 'Phase Retrieval from Coded Diffraction Patterns,' Stanford University, Technical Report No. 2013-12, December 2013] the initial approach is the same as in Gerchberg's G2 method. In other words, a number of measurements are taken by using a number of masks. They also mention the use of optical grating, ptychography and oblique illuminations as substitutes for masks. However, masks are the major mechanism used in their papers. The averaging step in G2 is replaced by a convex optimization method, which is also related to the matrix completion or matrix recovery problems.

In the Fourier-weighted projections method by Sicairos and Fienup [M. Guizar-Sicairos, J. R. Fienup, 'Phase Retrieval with Fourier-Weighted Projections,' *J. Optical Soc. Am. A*, Vol. 25, No. 3, pp. 701-709, March 2008], masks are also used to achieve high quality phase recovery. They propose different types of masks for this purpose.

Ptychography is another method which utilizes multiple diffraction intensity measurements [J. M. Rodenburg, 'Ptychography and Related Imaging Methods,' *Advances in Imaging and Electron Physics*, Vol. 150, pp. 87-184, 2008]. It was first introduced by Hoppe in the time period 1968-1973, especially for X-ray imaging. Ptychography relies on recording at least 2 diffraction intensities by shifting the illumination function or the aperture function with respect to the object to be imaged by a known amount instead of relying on masks. Thus, there is a moving probe which illuminates the object at a time. When there is sufficient amount of overlap between the different parts of illumination, phase recovery can be achieved by an iterative phase retrieval algorithm. Another related algorithm has recently been developed by Sicairos and Fienup based on diverse far field intensity measurements taken after translating the object relative to the known illumination pattern [M. Guizar-Sicairos, J. R. Fienup, 'Phase Retrieval with Transverse Translation Diversity: A Nonlinear Optimization Approach,' *Optics Express*, Vol. 16, No. 10, pp. 7264-7278, 12 May, 2008]. In this work, nonlinear optimization is used.

In summary, multiple diffraction intensity measurements are currently in use in the research community to solve phase and image recovery problems, for example, leading to diffractive (lensless) imaging [B. Abbey et al, 'Lensless Imaging Using Broadband X-Ray Sources,' *Nature Photonics*, pp. 420-424, 26 Jun. 2011]. This is especially important in areas such as X-ray and far infrared imaging in which lenses are very expensive.

SUMMARY OF THE EMBODIMENTS

Embodiments of the present invention improve upon prior art methods by using a minimal number of masks specially selected for excellent spectral phase and thereby complete information recovery. Consequently, the speed of computation is also increased. According to one method for recovering phase information from an array of points (for example, pixels) each having an amplitude, at least one transformation unit having an input and a spectral output is provided. The array of points may arrive optically in a coherent wave or electronically as data. The array may be one dimensional or higher dimensional, with two dimensional applications being more common. Amplitude information is recorded at the spectral points. The transformation unit may be a lens system with one or more lenses, or free space wave propagation, or a digital processing unit.

Acting upon the input to the transformation unit are at least two specially selected masks. There are two masking versions. In the first version, one of the masks is a unity mask (also referred to as a transparent mask with all its elements equal to 1). In the second version, there is at least one pair of complementary unipolar masks with their elements equal to 0 or 1 in amplitude. The input is applied separately to each of the at least two masks to generate a modified input from each of the masks. In accordance with an optical embodiment or the like, the masks are physical spatial masks. In such an embodiment, the input is a wave. The mask operating on the wave can be switched from one of the masks to another such that the input is individually received separately in sequence by each of the at least two physical spatial masks. Such switching can be accomplished in real time by optical devices such as a spatial light modulator or micromirror array, for example. Alternatively, the input wave could be split so that it is individually received in parallel by each of the physical spatial masks.

In any of the embodiments, it can be advantageous to include an outer border surrounding each mask that sets amplitudes of any points that coincide with the border to zero, i.e. the outer border blocks an outer periphery of the coherent wave.

In accordance with embodiments of the invention, the number of masks required can be reduced to two or three. In one embodiment, the masks consist of the unity mask and a phase mask (FIG. 1C-I). In particular, the phase may involve quantized phase values. Thus, in a particular embodiment the phase mask is a bipolar (meaning 1 and −1) binary mask corresponding to phase values equal to 0 or $\pi$ (FIG. 1C-II). In a further embodiment, the masks consist of the unity mask and at least one pair of complementary unipolar binary masks (with one mask having elements 1 and 0, and the other one having 1's and 0's switched) (FIG. 1C-III) Moreover, the masks may consist of the unity mask and a pair of masks that are complementary with respect to amplitude equal to 1.

Efficient selection of masks can also be achieved in embodiments that do not include use of a unity mask. In accordance with this still further embodiment, there are four masks including two pairs of masks. (FIG. 2). In each pair, the masks are complementary with each other with respect to amplitude. Thus, unity elements on such a mask may further include a phase factor in which the phase may involve continuous values between 0 and $2\pi$, or quantized phase values. In a more particular embodiment, the masks consist of two pairs of complementary unipolar binary masks.

In some embodiments an optical sensor or other form of camera is used at the input plane to detect the amplitudes of the coherent plane wave before the wave is modified by the masks. Similarly to the input being applied to the masks in the parallel processing embodiment, the beam may be split such that part of the beam enters the optical sensor while the rest proceeds to the masks. In the serial embodiment, the wave may sequentially, in time, pass through the optical sensor and then each of the masks.

In optional embodiments of the invention, a reference wave is added to the input wave travelling through the masks at the output plane before sensing. The reference wave provides more amplitude to the input wave which may make it easier to be read by the sensors. The reference wave is always subtracted after sensing the total wave amplitude. The reference wave may be added and subtracted digitally repeatedly during an iterative phase recovery process. The use of the reference wave may reduce the number of iterations required by the process. The reference wave may be added on-axis or off axis.

A generalized Fourier transform (FT) as that term is used herein encompasses a transform performed physically or digitally. A generalized FT is performed by the transformation unit on the modified inputs received from each mask to produce transformed modified inputs. The spectral plane (output) is defined as the output (plane) of the generalized FT. The generalized FT naturally occurs due to coherent wave propagation and/or when the modified inputs pass through a lens system. It involves additional phase factors. A prominent example is Fresnel diffraction in coherent optics.

For a transformation unit that is a digital processing unit, the generalized FT may be a generalized fast Fourier transform (FFT). At the spectral output of the transformation unit, amplitude values are recorded at an array of points to produce a phasorgram from each of the transformed modified inputs. A reference wave can be added to the spectral output before it is recorded. If added, the reference wave is always subtracted after sensing the total wave amplitude. In optical embodiments, the recording can be done by an intensity sensor, such as a camera at the spectral plane (output) of the lens system. The resulting amplitude information on the spectral output is called a phasorgram.

The method further includes associating a phase value with each point on each phasorgram to form a plurality of complex phasorgrams. The phase value may initially be a random phase value in any of the embodiments. The amplitudes and any phase values of the reference wave are subtracted from the complex phasorgram. The complex phasorgrams are fed into an iterative process that runs until convergence is achieved to produce a totagram constituting a reconstructed input with amplitude and phase information. The totagram includes complete and valuable information that can be used in any number of ways. For example in any of the embodiments, the totagram can be used to generate a representation of the reconstructed input with amplitude and phase.

In accordance with an embodiment for performing the iterative processing, the plurality of complex phasorgrams are processed by an inverse generalized Fourier transform and possibly other optimization steps. In an embodiment that includes camera sensors at the input plane, the amplitudes obtained from the inverse generalized Fourier transform are replaced by actual input plane amplitudes that were obtained from the camera sensors. A single estimate of the input is obtained by averaging the complex information at each input point. The single estimate of the input is passed through a process replicating each of the masks to obtain a plurality of intermediate arrays of0 points. A generalized fast Fourier transform is performed on each of the intermediate arrays, and then the amplitude values at each point in the transformed intermediate arrays are replaced with the corresponding initially recorded amplitude values to generate another plurality of complex phasorgrams. There may be additional optimization steps here. The iterative process is repeated with the generated complex phasorgrams until convergence is achieved, wherein upon completion the single estimate of the input is the totagram.

In any of the embodiments, any number of methods can be used to determine convergence. A simple method is to count up to a given number of iterations. Alternatively, convergence is achieved when an absolute difference between successive single estimates reaches a predetermined threshold.

In any of the optical embodiments, the at least one transformation unit includes a lowpass filter that has a numerical aperture (NA) that is equal to or greater than 0.7.

Any embodiment may generate superresolved amplitude and phase information of the input wavefront by either applying linear phase modulation to the input wave prior to passing the input wave through each of the at least two physical spatial masks or by moving the intensity sensor spatially.

Any embodiment may include performing a preceding generalized Fourier transform (FT) on the input prior to separately applying the input to each of the at least two masks, for example, for lensless imaging of distant objects.

In any embodiment, the at least two physical spatial masks may have elements, each with an aperture size of one of (i) 8×8 pixels or less, or (ii) 16×16 pixels or less for easier implementation. Each element of a mask has an associated constant amplitude and/or phase that is applied to each of the pixels or points passed through that element of the mask.

A system embodiment of the invention operates in accordance with one or more of the method embodiments. The system includes a transformation unit, which may be a lens system with one or more lenses or may be a digital processing unit. The transformation unit has an input plane and an output. The system further includes at least two masks disposed at the input plane of the transformation unit for receiving the coherent wave. In accordance with some embodiments, the at least two masks include a unity mask. In one embodiment, the masks consist of the unity mask and a phase mask (FIG. 1C-I). The phase mask may have quantized phase values. In particular, the masks may consist of the unity mask and a bipolar binary mask (FIG. 1C-II). In a further embodiment, the masks consist of the unity mask and a pair of complementary unipolar binary masks (FIG. 1C-III). More generally speaking, the masks may consist of the unity mask and one pair of masks or more than one pair of masks that are complementary with respect to binary amplitude.

In accordance with still further embodiments, the masks may consist of one pair or more than one pair of masks that are complementary with respect to amplitude without a unity mask. In particular, there may be four masks including two pairs of masks, wherein the masks in each pair are complementary with each other with respect to amplitude. This means the values 1 and 0 in one mask become 0 and 1, respectively, in the second mask (FIG. 2). Unity points on such a mask may further include a phase factor. In a more particular embodiment, the masks consist of two pairs of complementary unipolar binary masks.

In any of the embodiments, it can be advantageous to include an outer border surrounding each mask that sets amplitudes of any points that coincide with the border to zero. Indeed, according to a still further embodiment, the masks consist of one pair of complementary unipolar binary masks each with an outer border that sets amplitudes of any points that coincide with the border to zero.

In optical embodiments, the masks are physical spatial masks disposed at the input plane of the optical lens system. The masks operating on the wave can be switched from one of the masks to another such that the input is individually received separately in sequence by each of the at least two physical spatial masks. Such switching can be accomplished in real time by optical devices such as a spatial light modulator or micromirror array, for example. Alternatively, the input wave can be split by a beam splitter so that it is individually received in parallel by each of the physical spatial masks. In this case, a physical mask can be generated on a photographic film or plate.

An input separately modified by each of the masks is passed through the transformation unit. The transformation unit can be the optical lens system. The amplitude values at an array of points of the transformed modified inputs are recorded to produce phasorgrams. In the optical embodiments, recording of amplitude values is performed by at least one sensor system. The sensor system may be an intensity sensor, such as a camera.

A digital processor takes the amplitude values and associates a phase value with each point on each phasorgram to form a complex phasorgram for a plurality of points. In an embodiment that adds a reference wave at the camera input, the digital processor then subtracts the reference wave from the complex phasorgram after using the initial measured amplitude. The resulting phasorgram is iteratively processed until phase convergence is achieved, producing a totagram constituting a reconstruction image having amplitude and phase information. For the reference wave embodiment, reference wave values are added at the spectral output of the iterative process and subtracted from the phasorgram produced with the initially recorded amplitudes in each iteration.

The system further includes a processor configured to (1) associate an initial phase value with each point on each phasorgram to form a plurality of complex phasorgrams; and (2) iteratively process the plurality of complex phasorgrams until convergence is achieved to produce a totagram constituting a reconstructed input with amplitude and phase information.

BRIEF DESCRIPTION OF THE DRAWINGS

The foregoing features of embodiments will be more readily understood by reference to the following detailed description, taken with reference to the accompanying drawings, in which:

FIG. 1B-I is a schematic view of an embodiment of another system, in accordance with the present invention.

FIG. 1B-II is a schematic view of an embodiment of another system, in accordance with the present invention.

FIG. 1C-I is a schematic view of an embodiment of a system having a unity mask and a phase mask, in accordance with the present invention.

FIGS. 1C-II is a schematic view of an embodiment of a system having a unity mask and a bipolar binary mask, in accordance with the present invention.

FIGS. 1C-III is a schematic view of an embodiment of a system having a unity mask and a pair of unipolar masks, in accordance with the present invention.

DETAILED DESCRIPTION OF SPECIFIC EMBODIMENTS

Figure 1A:
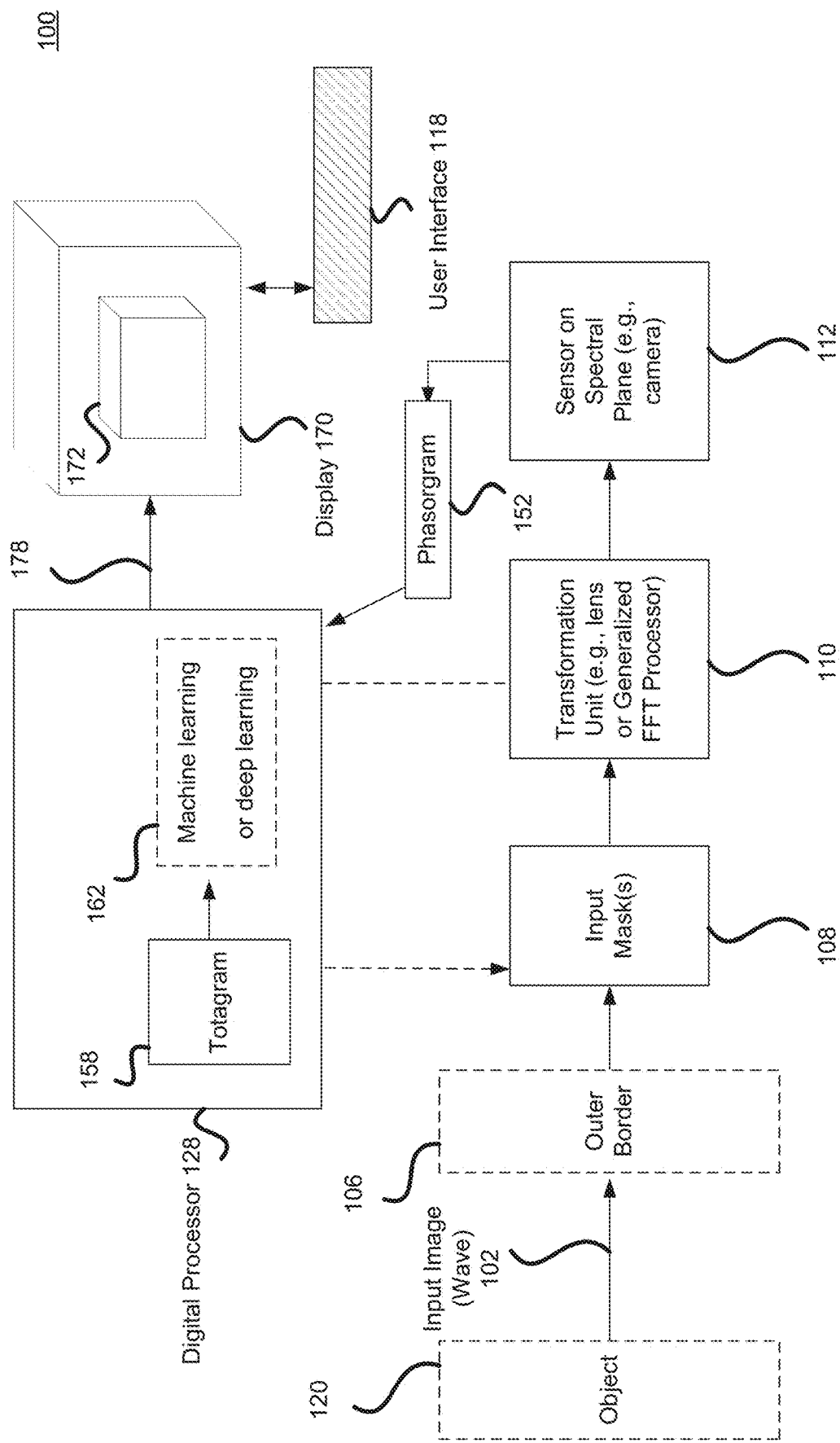
FIG. 1A is a schematic view of an embodiment of a system, in accordance with the present invention.

It is to be understood that the figures and descriptions of the present invention have been simplified to illustrate elements that are relevant for a clear understanding of the present invention, while eliminating, for the purpose of clarity, many other elements found in related systems and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this . . . invention belongs. Although any methods and materials similar or equivalent to those described herein can be used in the practice or testing of the present invention, exemplary methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of +20%, +10%, +5%, +1%, and +0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

Definitions. As used in this description and the accompanying claims, the following terms shall have the meanings indicated, unless the context otherwise requires:

The term "totagram" is defined herein as the resulting input phase and amplitude information from the iterative spectral phase recovery process using masks. The information can be one dimensional or multi-dimensional. In particular embodiments, the totagram is the reconstructed amplitude and phase of an input coherent wave at a particular wavelength.

The term "totagraphy" or the "totagraphic method" herein is defined herein as the process of obtaining totagrams.

"Totagraphic imaging" involves recording of spectral amplitude by a sensor/camera on the spectral plane in contrast to other imaging systems where recording of image information is done by a camera on the input plane.

"Holography" involves a physical recording of an interference pattern due to mixing of an object wave and a reference wave creating a hologram. On the other hand, totagraphy replaces the recording of an interference pattern between an object wave and a reference wave, as in holography, but instead performs several measurements using special masks which are iteratively processed to create a totagram, using the methods and systems defined herein.

A "phasorgram" is defined herein as information that includes the measured or recorded spectral amplitude information after processing an input wave by the transformation unit (e.g., a generalized Fourier transform) with respect to a particular input mask. Phasorgrams have little or no resemblance to the input wave because the spectral phase information is discarded and spectral amplitude is recorded.

In some aspects of the present invention, software executing the instructions provided herein may be stored on a non-transitory computer-readable medium, wherein the software performs some or all of the steps of the present invention when executed on a processor.

Aspects of the invention relate to algorithms executed in computer software. Though certain embodiments may be described as written in particular programming languages, or executed on particular operating systems or computing platforms, it is understood that the system and method of the present invention is not limited to any particular computing language, platform, or combination thereof. Software executing the algorithms described herein may be written in any programming language known in the art, compiled or interpreted, including but not limited to C, C++, C#, Objective-C, Java, JavaScript, MATLAB, Python, PHP, Perl, Ruby, or Visual Basic. It is further understood that elements of the present invention may be executed on any acceptable computing platform, including but not limited to a server, a cloud instance, a workstation, a thin client, a mobile device, an embedded microcontroller, a television, or any other suitable computing device known in the art.

Parts of this invention are described as software running on a computing device. Though software described herein may be disclosed as operating on one particular computing device (e.g. a dedicated server or a workstation), it is understood in the art that software is intrinsically portable and that most software running on a dedicated server may also be run, for the purposes of the present invention, on any of a wide range of devices including desktop or mobile devices, laptops, tablets, smartphones, watches, wearable electronics or other wireless digital/cellular phones, televisions, cloud instances, embedded microcontrollers, thin client devices, or any other suitable computing device known in the art.

Similarly, parts of this invention are described as communicating over a variety of wireless or wired computer networks. For the purposes of this invention, the words "network", "networked", and "networking" are understood to encompass wired Ethernet, fiber optic connections, wireless connections including any of the various 802.11 standards, cellular WAN infrastructures such as 3G, 4G/LTE, or 5G networks, Bluetooth®, Bluetooth® Low Energy (BLE) or Zigbee® communication links, or any other method by which one electronic device is capable of communicating with another. In some embodiments, elements of the networked portion of the invention may be implemented over a Virtual Private Network (VPN).

Introduction

FIG. 1A is a schematic view of an embodiment of a system 100 for use with the present invention. The system 100 recovers phase and amplitude information from a coherent input wave 102. The input wave 102 may be generated from an object 120. The object 120 may be an illuminated object. The system 100 includes at least one transformation unit 110 having a output plane and input plane (IP) and at least two masks 108. More specifically, the output plane may be a spectral plane (SP). The system is configured so that the input wave 102 is separately applied in series to each of the masks. In optical embodiments, the masks are physical spatial masks. Such physical masks may be implemented to change in real time from one mask to another by optical devices such as a spatial light modulator or a micromirror array. The at least two physical spatial masks may be located at the IP of the at least one transformation unit 110. In some embodiments, the transformation unit may be a lens system having one or more lenses. In any of the optical embodiments, the at least one transformation unit may also function as a lowpass filter that has a numerical aperture (NA) that is equal to or greater than 0.7. In other embodiments, the transformation unit may be implemented in a digital processor.

Each of the at least two masks may include an input window 106 formed of a respective opaque border surrounding the mask. Each opaque border is configured to block pixels in the input wave coinciding with the border thereby setting amplitudes of those pixels to zero. The at least two masks 108 are configured to modify phase or amplitude of its separately received input wave. The at least one transformation unit is configured to perform a generalized Fourier transform (FT) on the modified separately received input wave.

The system 100 further includes at least one sensor 112 configured to record amplitude values at an array of points of each transformed modified input at the SP. The at least one sensor generates a phasorgram 152 that includes the measured or recorded spectral amplitude information. Phasorgrams 152 may have little or no resemblance to the input wave 102 because the phase information is discarded. The sensor 112 may be a camera, which is an intensity sensor. The amplitude values are directly derived from intensity. Intensity is understood to be linearly proportional to the square of amplitude.

The system 100 further includes a digital processor 128. Phasorgrams 152 are iteratively processed by the processor 128 to generate a totagram 158. The processor 128 is configured to: associate a phase value with each point on each phasorgram to form a plurality of complex phasorgrams; and iteratively process the plurality of complex phasorgrams until convergence is achieved to produce a totagram 158 constituting a reconstructed input wave with amplitude and phase information. The spectral phase is recovered to go along with the recorded amplitude values. The input amplitude and phase can be obtained from the spectral phase and amplitude through using a generalized IFFT, if desired. The processor 128 may provide the totagram 158 for further processing 162. The computer processing 162 may include image processing, machine learning and/or deep learning. The processed result 178 may form an image 172 in a display 170 that is accessible by a user interface 118.

FIG. 1B-I and FIG. 1B-II are schematic views of systems 150A and 150B, respectively, in accordance with embodiments for separately applying the input in parallel to a plurality of physical spatial masks. The systems 150A and 150B each recover phase and amplitude information from an input wave 102. The input wave 102 may be generated from an object 120. The object 120 may be an illuminated object. The systems 150A and 150B each include at least two physical spatial masks 108 each disposed at the input plane of the corresponding transformation unit 110.

The systems 150A and 150B each further include a splitter 130A (also known as "beamsplitter" herein) configured to split the input wave 102 into two or more separate waves. Each of the separate waves from the splitter passes through a corresponding one of the at least two physical spatial masks 108 to produce a modified wave. The at least one transformation unit 110 is configured to perform a generalized Fourier transform (FT) on the modified input wave 102. The systems 150A and 150B include a sensor 112 configured to record spectral amplitude images of the transformed separate waves at the spectral plane for each transformation unit. The systems 150A and 150B include a processor 128 which operates as previously described with respect to FIG. 1A.

Figures 1, 1B:
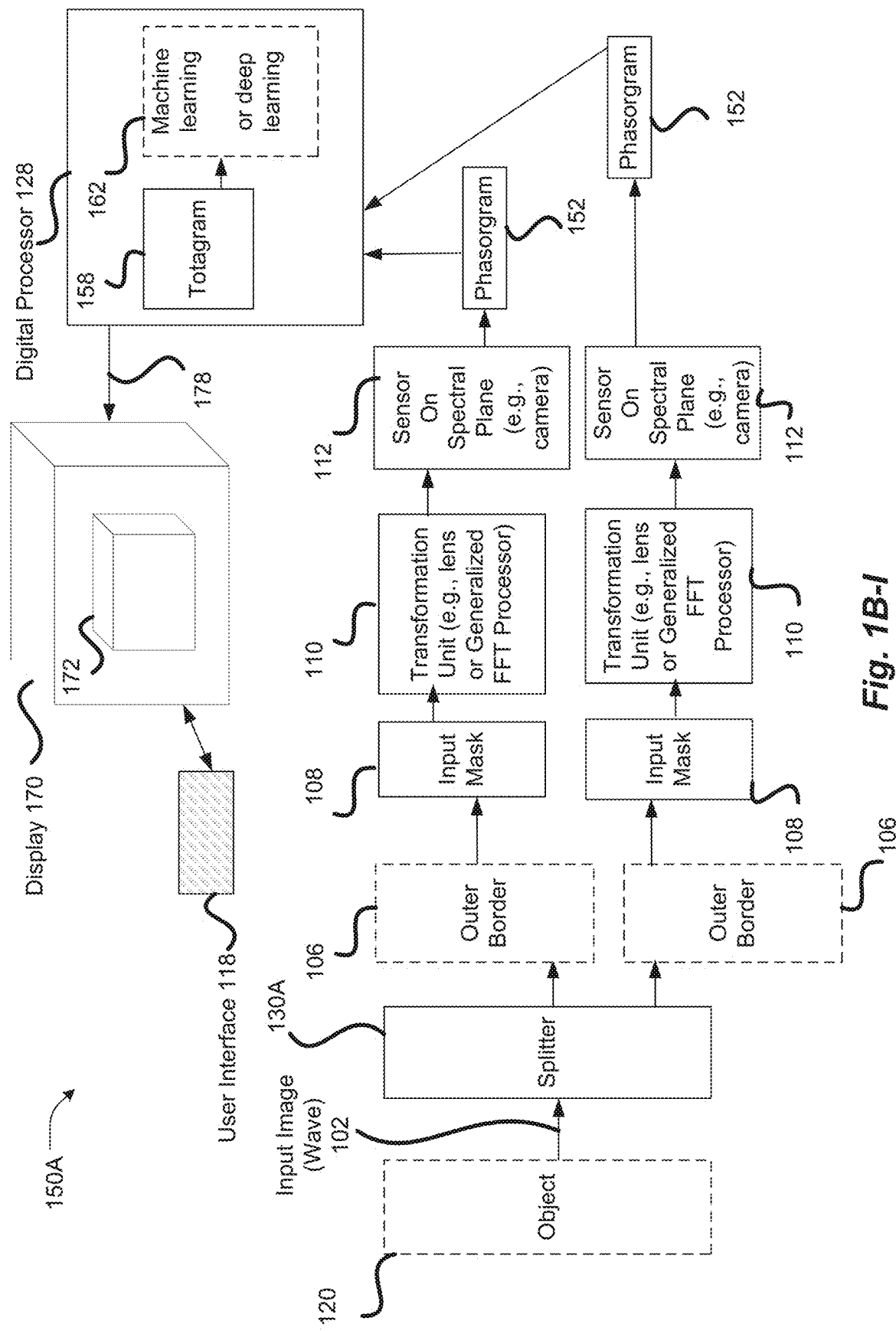

In addition, system 150B, as shown in FIG. 1B-II, may perform, via a transformation unit 107, a preceding generalized Fourier transform (FT) on the input wave 102, prior to passing the input wave 102 individually through the splitter 130A. In particular embodiments, the transformation unit 107 is a lens that receives the input wave enroute to the input masks 108. The preceding generalized Fourier transform of transformation unit 107 converts the initial input plane image (wave) to a second image (wave). On this plane, the input masks 108 are used with the second image with a generalized Fourier transform through transformation unit 110 as before for illuminating the intensity sensor 112.

The iterative phase recovery process includes only the second image (wave). Once the phase recovery is completed, the initial input plane image (wave) is recovered by a final inverse generalized Fourier transform.

In accordance with embodiments of the present invention, each of FIGS. 1C-I, 1C-II, 1C-III, and 2 illustrate minimal sets of masks that achieve complete phase recovery more quickly and efficiently than systems with many more masks. FIGS. 1C-I, 1C-II and 1C-III make advantageous use of a unity mask 108$t$, which can also be referred to as a transparent mask. The input wave passes through the unity mask undisturbed, thus physically the unity mask may be achieved by any unobstructed light path. Optionally, to further improve on the efficiency of the computational process an opaque outer border may surround the unity mask as shown in the figures. The border sets amplitude of points on the wave coinciding with the outer border to zero. While multiple masks can be added to a system, according to these embodiments of the invention, inclusion of a unity mask can achieve the desired totagram with as few as one or two additional masks. If more masks are used, the final information recovery is of higher quality when one of the masks is a unity mask.

FIG. 1C-I is a schematic view of an embodiment of a system having a unity mask 108$t$ and a phase mask 108$c$. A phase mask 108$c$ imparts a phase shift on points passing through the mask. Each pixel or element (group of pixels) of the mask may impart its own designated phase shift which may vary from element to element. In a two-dimensional mask, an element is typically a square of pixels having an aperture size measured by the number of pixels on a side. A phase mask may be advantageously simplified by involving quantized phase values. For example, with 2-level quantization, the quantized phase values are 0 and 1, resulting in phase factors equal to 1 or −1. Such a phase mask is called a bipolar binary mask.

As shown in FIG. 1C-II, a unity mask 108$t$ and a bipolar binary mask 108$b$ can be the only two masks, in accordance with an embodiment of the present invention. Even these two simple masks efficiently produce a totagram. The unity mask is essentially all 1's and the bipolar binary mask is a "checkerboard" of randomly distributed 1's and −1's. Opaque outer borders can surround the masks for further improving efficiency.

FIG. 1C-III is an embodiment of the present invention that takes advantage of unipolar binary masks 108$u$. The pixels or elements of a unipolar binary mask are either open (an amplitude of 1 meaning pass) or closed (an amplitude of 0 meaning no pass). The pixels or elements are arranged in a random pattern. The unipolar binary masks are used in a pair in which the masks are complementary with each other with respect to amplitude. This means for an element location in one mask having an amplitude of 1, the corresponding element in the other mask has an amplitude of 0. A minimal mask configuration for efficiently generating totagrams includes a unity mask 108$t$ and a complementary pair of unipolar binary masks 108$u$.

Figure 2:
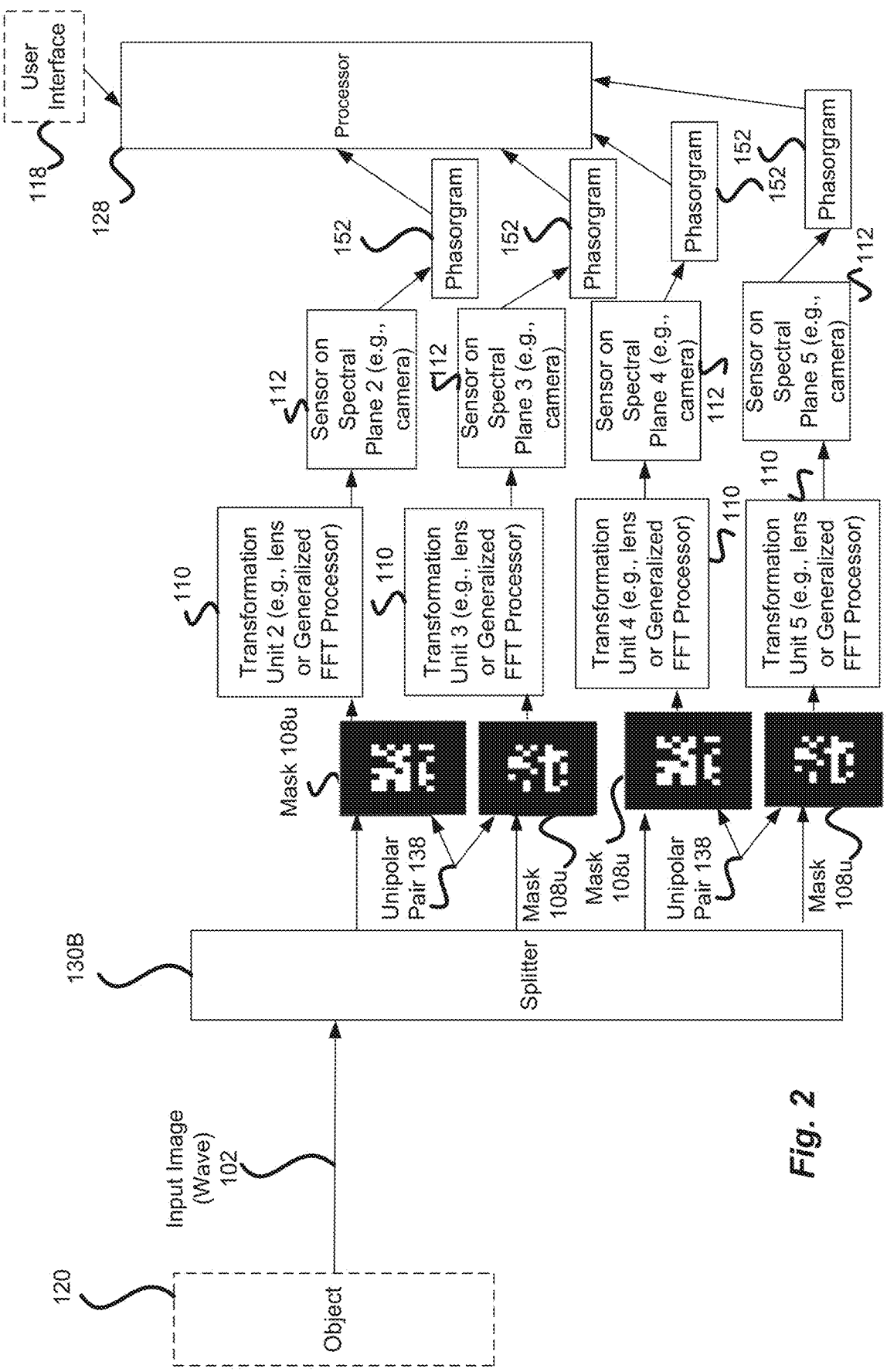
FIG. 2 is a schematic view of an embodiment of a system having two pairs of unipolar masks, in accordance with the present invention.

FIG. 2 is a schematic view of an alternative embodiment of the present invention that uses two pairs of complementary binary masks 108$v$, wherein a unity mask is not necessary. In accordance with this embodiment a totagram can be determined using at least four masks. The four masks include two pairs of masks, wherein the masks in a pair are complementary with each other with respect to amplitude. In particular, the four masks may all be unipolar binary masks. While the amplitudes of the mask elements are 1's or 0's, it is also possible to include random phase factors in the 1 elements making the masks complex.

In a still further embodiment of the present invention, the masks 108$v$ can be reduced to only one pair of complementary binary masks. Such a configuration of masks may have difficulty producing a totagram when the input has a full range of phase variation from 0 to $2\pi$. But for inputs limited in phase in a narrower range such as between 0 and $\pi$, one pair of complementary masks can be sufficient. Again, the masks in a pair are complementary with each other with respect to amplitude. In particular, both masks may be unipolar binary masks. This case would be further improved if opaque borders surround the masks. Thus, for certain applications, this single pair of complementary binary masks may be used instead of two pairs.

Figure 3A:
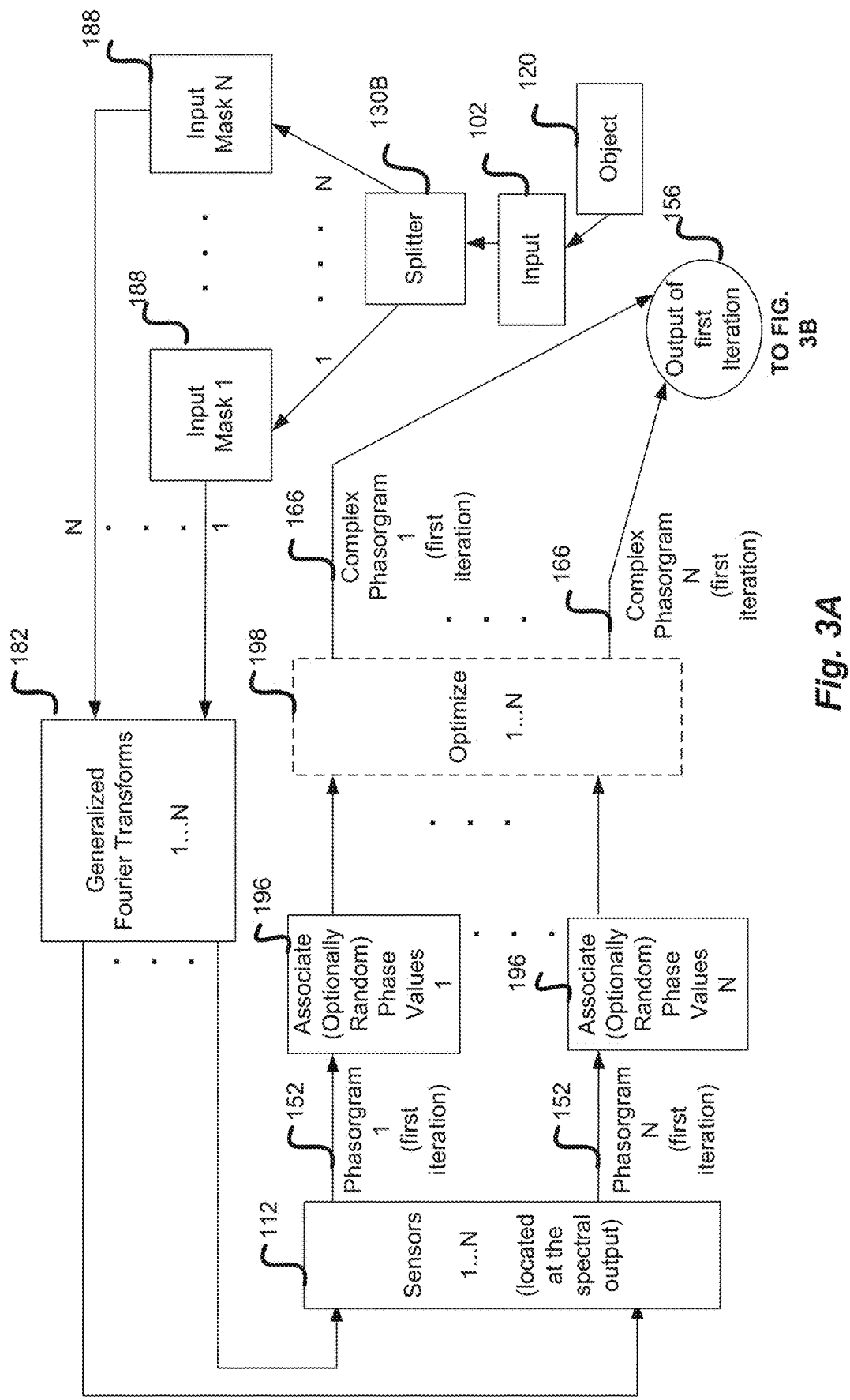
FIGS. 3A and 3B is a flow diagram of a method of phase recovery, in accordance with embodiments of the present invention.

The phase recovery system for use with the masks of embodiments of the present invention shall now be described in greater detail with respect to FIGS. 3A and 3B. The input 102 to the system is an array of points, each point having an amplitude. The array may be one dimensional or higher. In an optical environment, the input is a coherent wave captured as a two-dimensional array of pixels (points). The system may receive its input via an input image (wave) from an object 120. The object 120 may be an illuminated object. To recover full color wave information, several phase recovery systems can be configured to run in parallel. For example, each system can operate on its own coherent wave for one of the three primary colors (wavelengths). This can be generalized to multispectral and hyperspectral images (waves) with more than 3 wavelengths.

The input needs to be separately presented to each of the masks. This is easily performed in a digital embodiment processing the input array separately through each of a plurality of masks. In an optical embodiment, a splitter 130B can be used to replicate the input point array for each of the masks. Alternatively, the input masks can be switched out in series by a spatial light modulator or micromirror array as described with respect to FIG. 1A. In some embodiments, the splitter may be used to direct the input to camera sensors located at the input plane.

The system is configured with a plurality of masks 188 according to any of the embodiments described above with respect to FIGS. 1C-I, 1C-II, 1C-III and 2. Additional masks can also be used, but it is advantageous to minimize the number of masks and hence the amount of computations and ease of implementation. Optionally, outer borders surrounding the masks can be used to further facilitate efficiency and accuracy of the iterative computational process. The input modified by each mask is passed through a transformation unit 110 to perform a generalized Fourier transform 182. In optical embodiments, the transformation unit can be a lens or a system of lenses. In digital embodiments, the generalized Fourier transform 182 is computed. The generalized Fourier transform may be a generalized FFT.

The transformed modified inputs are each fed to a sensor 112 for recording amplitude values at the spectral array of points of each transformed modified input. The array of amplitude values is referred to as a phasorgram. The sensor 112 is insensitive to phase. Thus, any phase aberrations which can be modeled as phase variations on the spectral plane (output) are removed at the sensor. In optical embodiments, the sensor 112 may be an intensity sensor, such as a camera. Intensity is linearly proportional to the square of amplitude.

The method further includes, in the digital processor 128, associating a phase value 196 with each point on each phasorgram to form a plurality of complex phasorgrams. In preferred embodiments, a randomly selected phase value is associated with each point. Inclusion of phase leads to a complex phasorgram.

The complex phasorgrams enter an iterative process. A number of approaches are known in the art. One such process is G2. Other approaches are demonstrated in Phase-pack, for example. Depending on the process being implemented in the system, the complex phasorgrams may each optionally go through an optimization process 198 (which can be at the input and/or the output of the iterative system). Then, each complex phasorgram is processed through an inverse generalized Fourier transform 186. For an FFT, the inverse is an IFFT and vice versa.

The outputs of the inverse generalized Fourier transform is optionally optimized depending on the process implemented and then the complex information at each corresponding point is averaged 178 to produce a single estimate of the input. Another optimization process may be optionally included at the output side of the iterative process. Each time a single estimate is obtained, the process determines whether convergence has occurred 172. According to one convergence test, the processing continues until a difference between successive single estimates reaches a predetermined threshold. According to another approach, convergence is assumed to have been reached after a given number of iterations of determining a single estimate have been completed. According to some embodiments, the predetermined threshold is reached when the Fractional Error, that is the Sum of the Squared Error (SSE) over all N images output from the inverse generalized Fourier transforms divided by the amplitudes squared over all N images (the total energy) between two successive iterations, is less than a value, such as, but not limited to 0.0001. The SSE represents a difference squared between the N current waveforms and the last estimate. Alternatively, the SSE can be defined in terms of the current estimate after averaging and the last estimate. Once convergence has been achieved, the final estimate of the input amplitude and phase constitutes the totagram.

Figure 3B:
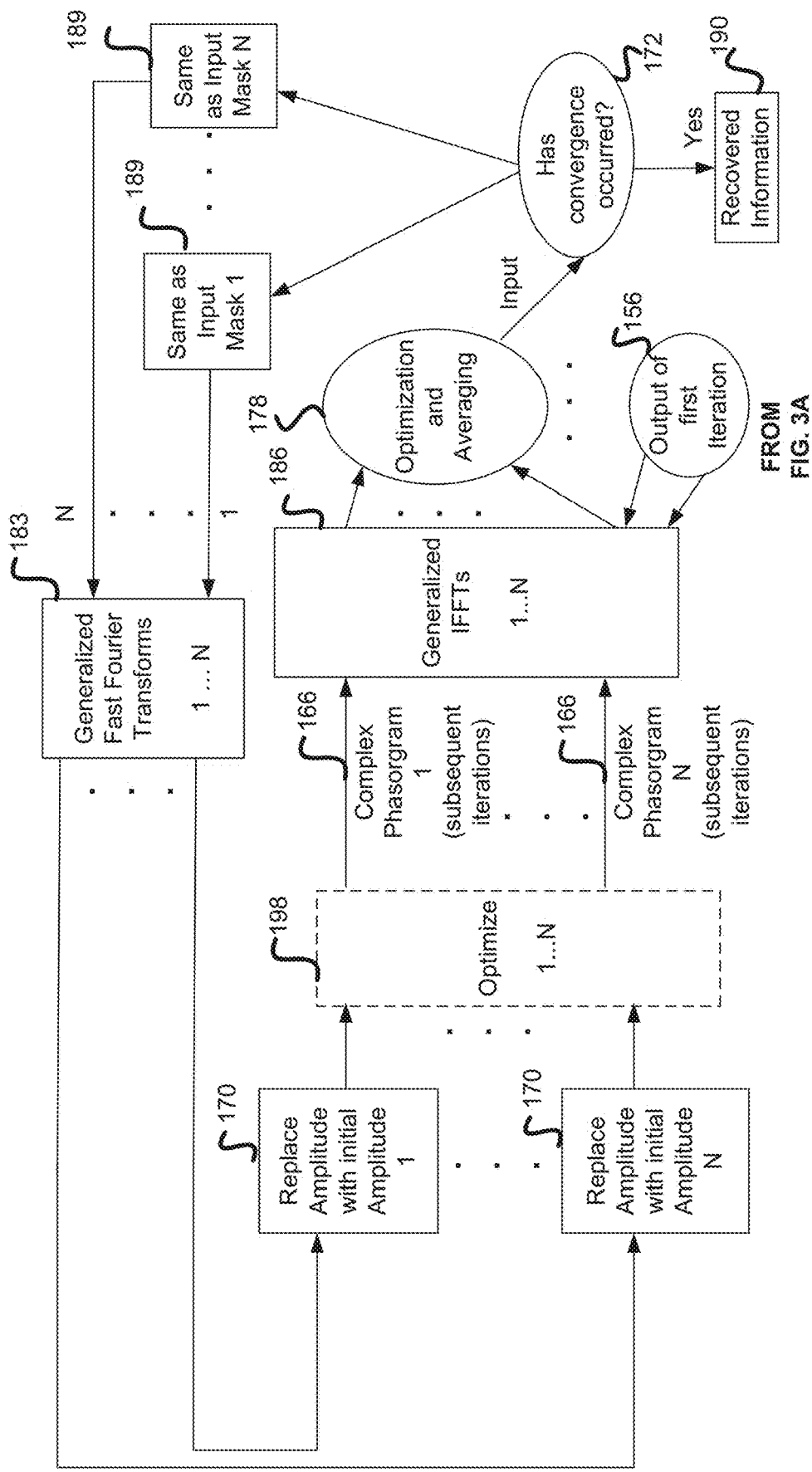

The iterative process is further illustrated in FIG. 3B. The single estimate is passed through a process 189 replicating each of the input masks to obtain a plurality of intermediate arrays, one from each mask. In other words, the phase shift and/or amplitude factor for each element in the corresponding mask then modifies the input to yield the intermediate arrays. A generalized fast Fourier transform 183 is performed on each of the intermediate arrays. At each point in the transformed intermediate array, the amplitude value is replaced 170 by the corresponding amplitude value initially recorded by the sensors 112, thereby generating another iteration of complex phasorgrams. The complex phasorgrams are optimized, if applicable to the iterative process being implemented. Then, as in the first iteration, each complex phasorgram is processed through an inverse generalized Fourier transform 186. For an FFT, the inverse is an IFFT and vice versa. The outputs of the inverse generalized Fourier transform is optionally optimized depending on the process implemented and then the complex information at each corresponding point is averaged 178 to produce a single estimate of the input. The process continues iteratively until convergence has occurred 172.

Optionally, the phase recovery method may generate superresolved amplitude and phase information from the input wave by performing linear phase modulation on the input wave a number of times prior to passing the input wave through each of at least two physical spatial masks or moving the intensity sensor spatially after passing the input wave through each of the at least two physical spatial masks a number of times. This can also be achieved by moving the location of the spectral output a number of times.

In any embodiment of the at least two masks, each element of a nonunity mask may have an aperture size of 8×8 pixels or less. In any embodiment consisting of at least two masks, a nonunity mask may have an aperture size of 16×16 pixels or less. Each element of a nonunity mask has an associated constant amplitude and/or phase that is applied to each of the pixels or points passed through that element of the mask.

Any embodiment may include processing the totagram to provide a solution to a task. These tasks may include microscopy, encoding, signal processing, wavefront sensing, and/or light computing. The information within a totagram can be converted into a hologram by using recovered amplitude and phase information. The result is known as a digital hologram or computer-generated hologram. The 3-D information of a totagram can also be visualized in other ways by digital techniques such as by computer graphics, volumetric displays, virtual reality, augmented reality, or mixed reality. Any embodiment may include displaying a result or representation of the solution on a display.

The efficacy of the system and methods of the present invention has been shown for a wide variety of inputs. If the input has zero phase, this means the input has only amplitude variations. This is the simplest case. The most general case has the input phase varying between 0 and $2\pi$ radians.

There are two major categories of suitable mask combinations according to the embodiments of the present invention. In the first category, the first mask is a unity (clear, transparent, with all elements equal to +1) mask. The second mask can be (1) a phase mask with phase changing between 0 and $2\pi$ radians, (2) a quantized phase mask with elements equal to quantized phase values, (3) a bipolar binary mask with elements equal to +1 and −1, corresponding to quantized phases chosen as 0 and pi radians, (4) a pair of complementary masks, meaning one mask has elements 0 and $\exp(j\theta_1)$, $\theta_1$ being a quantized or continuous phase, and the second mask having corresponding elements equal to $\exp(j\theta_2)$, $\theta_2$ being a quantized or continuous phase, and 0, respectively. In other words, the masks are complementary with respect to amplitude. If an element of one mask has the value 0, the corresponding element in the other mask of the pair has amplitude of 1 and the associated phase factor. In a specific case, when $\theta_1$ and $\theta_2$ are chosen equal to 0, the masks become a complementary pair of unipolar binary masks with elements equal to 0 and 1. In another specific case, when $\theta_1$ and $\theta_2$ are limited to either 0 or $\pi$, the masks become a complementary pair of binary masks with elements equal to 0 and ±1. Binary refers to the two amplitude values, either 0 or 1.

In the second category, the transparent mask is not required, rather, there are pairs of complementary masks, preferably two or more pairs. In particular, two pairs of complementary unipolar (+1 and 0) binary masks can be effectively used. If more masks are used, the number of phase recovery iterations are usually reduced.

In all cases discussed in categories 1 and 2, it is possible to use outer borders filled with zeros. Use of borders, for example, by doubling the mask size and filling the outer border of the mask with zeros usually gives more accurate reconstruction results or reduced number of phase recovery iterations.

Coherent Phase/Amplitude Recovery with G2

A major application of coherent phase/amplitude recovery is imaging which can be 2-D, 3-D or higher dimensional. In order to achieve multidimensional imaging, it is necessary to have complete wave information consisting of amplitude and phase. Below G2 is discussed as an example of a number of candidate methods for coherent phase/amplitude recovery.

Assuming a constant z (the longitudinal direction), the coherent spatial wave can be written as $$u(x,y)=A(x,y)e^{j\alpha(x,y)} \tag{1}$$

where $A(x,y)$ is the input spatial amplitude and $\alpha(x,y)$ is the input spatial phase at (x,y,z)

At this point, we will assume that the wave is generalized Fourier transformed. In a digital implementation, this means the wave is processed by generalized FFT. In an optical implementation, the wave goes through a lens system with focal length F. Then, the initial wave is assumed to be at z=−F. The spectral plane is at z=F. It is known that on the spectral plane, the wave is proportional to the Fourier transform of the input wave [O. K. Ersoy, Diffraction, Fourier Optics and Imaging, J. Wiley, November 2006, incorporated by reference in its entirety herein]. This is the case discussed below.

On the spectral plane, the corresponding wave can be written as $$U(f_x,f_y)=B(f_x,f_y)e^{j\Theta(f_x,f_y)} \tag{2}$$

where $B(f_x,f_y)$ is the spectral amplitude, and $\Theta(f_x,f_y)$ is the spectral phase. $(f_x,f_y)$ corresponds to the spatial frequencies. With the lens system, they are given by $$f_x=x/\lambda F \tag{3}$$

$$f_y=y/\lambda F \tag{4}$$

where $\lambda$ is the wavelength, and $(^xf, ^yf)$ are the spatial coordinates on the spectral plane.

Assuming the sensor is located on the spectral plane, or, on purpose, the spectral phase is lost, and the spectral amplitude is obtained via spectral intensity $I(f_x, f_y)$ as $$I(f_x,f_y)=|B(f_x,f_y)|^2 \tag{5}$$

In subsequent iterations with a computer, $I(f_x,f_y)$ is processed further by fast Fourier transform (FFT) techniques.

Below the details of digital processing with the discrete Fourier transform (DFT) and its inverse (IDFT), their fast algorithms fast Fourier transform (FFT) and inverse fast Fourier transform (IFFT) are further described. The following will be defined:

S: input signal
$P_i$: input mask, i=1,2 . . . , M
M: number of masks
FT: Fourier transform (DFT in numerical work)
IFT: Inverse Fourier transform (IDFT in numerical work)
$\theta_i$=output phase, i=1,2 . . . ,M
$\theta_i$ is chosen randomly in the range $[0,2\pi]$ in the first iteration during phase recovery.

The initial transformations in the first iteration between the input space and the output space are as follows:

$$S_i=P_i\cdot S, i=1,2, \ldots ,M \tag{6}$$

$$A_i=|FT(S_i)|, i=1,2 \ldots ,M \tag{7}$$

$$U_i=IFT(A_i\cdot e^{j\theta_i}), i=1,2 \ldots ,M \tag{8}$$

$$V_i=U_i/P_i, i=1,2 \ldots ,M \tag{9}$$

where the operations · and / denote pointwise multiplications and divisions, respectively: The next iteration is started after averaging $V_i$'s as follows:

$$S=\frac{1}{M}\sum_{i=1}^{M}V_i \tag{10}$$

Then, equations (6-10) during the current iteration are repeated. The iterations are stopped either by checking whether $A_i\cdot e^{j\theta_i}$ is changing negligibly or if a specified maximum number of iterations are completed.

The DFT and inverse DFT in the 1-D case are given by $$S_2^i(k) = \sum_{n=0}^{N-1} S_1^i(n)e^{-j2\pi nk/N} \quad n, k = 0, 1, 2, \ldots, (N-1) \tag{11}$$

$$S_i(k) = \frac{1}{N}\sum_{n=0}^{N-1} S_3^i(n)e^{j2\pi nk/N} \quad n, k = 0, 1, 2, \ldots, (N-1) \tag{12}$$

Equations (11) and (12) can be easily extended to the 2-D case.

Design for Digital/Optical Implementation

Digital implementation of iterative phase recovery methods can be done in a computer system.

Digital/optical implementation of the iterative phase recovery methods can also be done by fabrication of an optical system to be coupled with a digital system fed by the output of the digital sensor/camera for subsequent iterative processing.

For digital/optical implementation, spectral imaging with a high resolution camera and real time electronic phase/amplitude masks such as spatial light modulators are used. Subsequent digital processing is done by a computer system with high precision. FFT techniques require their own sampling intervals. These should be matched to the pixel intervals with the camera.

Once amplitude and phase recovery is completed in the optical/digital system, the information is called a totagram.

Any embodiment may include processing the totagram to provide a solution to a task. These tasks may include microscopy, encoding, signal processing, wavefront sensing, and/or light computing. The information within a totagram can be converted into a hologram by using recovered amplitude and phase information. The result is known as a digital hologram or computer-generated hologram. The 3-D information of a totagram can be visualized in other ways by digital techniques such as by computer graphics, volumetric displays, virtual reality, augmented reality, or mixed reality.

The experimental results in an optical/digital system may not be as perfect as the purely digital implementation results. In order to compensate for the differences, machine learning (ML) and deep learning (DL) techniques can be used to improve the results. Such techniques have recently been reported for aiding phase recovery and diffractive imaging [Y. Rivenson, Y. Zhang, H. Günaydin, Da Teng and A. Ozcan, 'Phase Recovery and Holographic Image Reconstruction Using Deep Learning in Neural Networks,' *Light: Science & Applications*, Vol. 7, 17141, 2018, incorporated by reference in its entirety herein]. G. Barbastatis, A. Ozcan, G. Situ, 'On the Use of Deep Learning for Computational Imaging,' *Optica*, Vol. 6, No. 8, pp. 921-943, August 2019, incorporated by reference in its entirety herein]. ML and DL utilize very large data bases of images. For example, the input image to the system can be what is achieved experimentally, and the output desired image is what it should ideally be. By training with a very large database of such images, ML and DL methods have been reported to achieve good results.

Iterative Phase Recovery Methods with Diffraction Limited Optical Components

The transformation unit 110 may be a coherent optical system that is at least diffraction-limited, and is governed by a point-spread function and its Fourier transform, the coherent transfer function (CTF). The system acts as an ideal lowpass filter with a cutoff frequency governed by the lens system numerical aperture NA. In this section, we show and claim that with sufficiently large NA (~0.7), iterative phase recovery is unhindered by diffraction.

A diffraction limited lens system acts as a linear system with a point spread function $h(x,y)$ and a coherent transfer function $H(f_x, f_y)$ which is the Fourier transform of $h(x,y)$. The linear system equation in the space domain is given by $$u_{output}(x,y) = h(x,y) * u_{input}(x,y) \tag{13}$$

where * denotes linear 2-D convolution, and $u_{output}(x,y)$ is the output spatial wave. The corresponding spectral equation by convolution theorem is given by $$U(f_x, f_y) = H(f_x, f_y)U(f_x, f_y) \tag{14}$$

where $U(f_x, f_y)$ is the Fourier transform of the output spatial wave.

A coherent wave illumination on a 3-D object will be assumed. This can be achieved with a laser or high quality light emitting diode (LED). For example, a He—Ne laser operates at wavelength $\lambda$ equal to 0.6386 micron ($\mu = 10^{-6}$ m), and a LED operates around $\lambda = 0.5\mu$.

Some quantities of interest are the following:
$k_0 = 2\pi/\lambda$, the wave number
NA=numerical aperture
sp=sampling pixel size of camera
fp=final pixel size of reconstruction Due to diffraction, the optical imaging system has a cutoff frequency given by $$f_C = NA \cdot K_0 \tag{15}$$

The sampling frequencies on the spectral plane will be written as, $$kxs = kys = -k_{max}, -k_{max} + \Delta k, \ldots, +k_{max} \tag{16}$$

where, for $N_1$ sampling points along x and y directions, $\Delta k$ can be chosen as $$\Delta k = \frac{2k_{max}}{N_1 - 1} \tag{17}$$

Then, the coherent transfer function is given by $$H(f_x, f_y) = CTF(f_x, f_y) = \begin{cases} 1 & k_s < f_c \\ 0 & \text{otherwise} \end{cases} \tag{18}$$

where $$k_s = \sqrt{kxs^2 + kys^2} \tag{19}$$

for each component of kxs and kys.

The inventor has made experiments to discover which values of NA allows for a perfect reconstruction. It has been determined that with NA=0.7 or higher the reconstructed images are visually as good as the originals.

Aberrations

Aberrations are departures of the ideal wave within the exit pupil of a lens system from its ideal form. In a coherent imaging system, this can be modeled as multiplying the optical transfer function by a phase factor. In this section, it is shown and claimed that phase aberrations have no detrimental effect on the performance of iterative phase recovery methods.

A diffraction-limited system means the wave of interest is perfect at the exit pupil, and the only imperfection is the finite aperture size. Aberrations are departures of the ideal wave within the exit pupil from its ideal form. In order to include phase aberrations, the exit pupil function can be modified as $$P_A(x,y)=P(x,y)e^{jk\phi_A(x,y)} \quad (20)$$

where $P(x,y)$ is the exit pupil function without aberrations, and $\phi_A(x,y)$ is the phase error due to aberrations.

The phase function $\phi_A(x,y)$ is often written in terms of the polar coordinates as $\phi_A(r,\theta)$. What is referred to as Seidel aberrations is the representation of $\phi_A(r,\theta)$ as a polynomial in $r$, for example, $$\phi_A(r,\theta)=a_{40}r^4+a_{31}r^3\cos\theta+a_{20}r^2+a_{22}r^2\cos^2\theta+a_{11}r\cos\theta \quad (21)$$

Higher order terms can be added to this function. The terms on the right-hand side of Eq. (19) represent the following:

- $a_{40}r^4$: spherical aberration
- $a_{31}r^3\cos\theta$: coma
- $a_{20}r^2$: astigmatism
- $a_{22}r^2\cos^2\theta$: field curvature
- $a_{11}r\cos\theta$: distortion Zernicke Polynomials The phase aberrations present in an optical system can also be represented in terms of Zernicke polynomials, which are orthogonal and normalized within a circle of unit radius [V. N. Mahajan, "Zernike circle polynomials and optical aberrations of systems with circular pupils," *Engineering and Laboratory Notes*, R. R. Shannon, editor, supplement to *Applied Optics*, pp. 8121-8124 December 1994]. In this process, the phase function $\phi_A(x,y)$ is represented in terms of an expansion in Zernike polynomials $z_k(\rho,\theta)$, where $\rho$ is the radial coordinate within the unit circle, and $\theta$ is the polar angle.

Each Zernike polynomial is usually expressed in the form $$z_k(\rho,\theta)=R_n^M(\rho)\cos m\theta \quad (22)$$

where $n,m$ are nonnegative integers. $R_n^m(\rho)$ is a polynomial of degree $n$, and contains no power of $n$ less than $m$. In addition, $R_n^m(\rho)$ is even (odd) when $m$ is even (odd), respectively. The representation of $\phi_A(x,y)=\phi_A(\rho,\theta)$ can be written as $$\phi_A(\rho,\theta)=A_\infty+\frac{1}{\sqrt{2}}\sum_{n=2}^\infty A_{n0}R_n^0(\rho)+\sum_{n=1}^\infty\sum_{m=1}^\infty A_{nm}R_n^m(\rho)\cos m\theta \quad (23)$$

The coefficients $A_{nm}$ are determined for finite values of $n$ and $m$ by least-squares. In turn, $\phi_A(\rho,\theta)$ can also be written as $$\phi_A(\rho,\theta)=\sum_{k=1}^K w_k z_k(\rho,\theta) \quad (24)$$

where $K$ is an integer such as 37. The coefficients $w_k$ are found by least-squares. Since each successive Zernike term is orthonormal with respect to every preceding term, each term contributes independently to the mean-square aberration. This means the root-mean square error $\overline{\phi_A}$ due to aberrations can be written as $$\overline{\phi_A}=\left[\sum_{k=1}^K w_k^2\right]^{\frac{1}{2}} \quad (25)$$

Note that the Zernike representation of aberrations is valid when the exit pupil is circular. Otherwise, the Zernike polynomials are not orthogonal.

Coherent optical systems have aberrations. They are usually modeled as phase factors on the spectral plane of the system. For example, such modeling can be done in terms of polynomials expressing phase due to aberrations, such as Seidel aberrations and Zernicke polynomials. On the spectral plane, the intensity is measured, and all phase is lost. That includes the phase due to aberrations. The camera eliminates all phase, and consequently phase aberrations which can be represented as phase factors on the spectral plane have no detrimental effect on the performance of iterative phase recovery methods according to FIGS. 3A and 3B.

Superresolution with Iterative Phase Recovery Methods

In the previous section, perfect phase reconstruction was achieved for applications such as 3-D imaging. This was made possible with a high NA diffraction-limited lens system, and a high dynamic range, high resolution camera. In this section, a system including linear phase modulation of the object wave and iterative phase recovery methods is discussed to improve a given lens system having low NA, low field of view and aberrations.

Low NA means filtering out high spatial frequencies on the spectral plane. Low field of view means small area of detection by the camera. Aberrations can be modeled as phase modulation on the spectral plane as discussed in the previous section. In order to bypass these problems, and/or to achieve higher resolution than what is possible with the given lens system and camera, we will consider a method similar to what is used in synthetic aperture microscope [Terry M. Turpin, Leslie H. Gesell, Jeffrey Lapides, Craig H. Price, "Theory of the synthetic aperture microscope," *Proc. SPIE 2566, Advanced Imaging Technologies and Commercial Applications*, doi: 10.1117/12.217378, 23 Aug. 1995] and Fourier ptychographic imaging [G. Zheng, R. Horstmeyer, C. Yang, "Wide-field, high-resolution Fourier ptychographic microscopy," *Nature Photonics*, pp. 739-745, Vol. 7, September 2013]. For this purpose, the input object wave will be modulated (multiplied) by a number of plane waves given by $$u'_{input}(x,y)=u_{input}(x,y)e^{j(k_{xm}x+k_{ym}y)} m=1,2,\ldots,M \quad (26)$$

This can be achieved in a number of ways. For example, a LED matrix array can illuminate the 3-D object of interest with angle varied plane waves. Alternatively, a real-time reconfigurable array of diffraction gratings can be generated with spatial light modulators (SLM's) [S. Ahderom, M. Raisi, K. Lo, K. E. Alameh, R. Mavaddah, "Applications of Liquid crystal light modulators in optical communications," Proceedings of 5th IEEE International Conference on High Speed Networks and Multimedia Communications, Jeju Island, Korea, For each $m$, the linear imaging system has an output image given by $$u'_{output}(x,y)=h(x,y)*u'_{input}(x,y) \quad (27)$$

Assuming a diffraction-limited imaging system, the coherent transfer function is what governs imaging, and Eq. (24) in the spectral domain becomes $$U'(f_x,f_y)=H(f_x,f_y)U(f_x-f_{xm},f_y-f_{ym}) \quad (28)$$

For example, when the wavelength $\lambda$ is 0.5 micron, the wave number becomes $$k_0=2\pi/\lambda=1.23\cdot 10^{-5} m^{-1}$$

The cutoff frequency for the CTF is $$f_C = NA \cdot k_0 \qquad (29)$$

When NA=0.1, and the DFT(image) size is 256×256, a 32×32 window of DFT spectral points fits right in to the CTF circle with radius $f_C$ equal to $1.257 \cdot 10^6$ m$^{-1}$. Let K×K be the number of plane waves needed to modulate the input wave. In this example, we get K=256/32=8.

Similarly, when NA=0.2 and the DFT(image) size is 256×256, a 64×64 window of DFT spectral points fits right in to the CTF circle with radius $f_C$ equal to $1.257 \cdot 10^6$ m$^{-1}$. In this case, for K×K number of plane waves needed to modulate the input wave, we get K=256/64=4.

Modern high resolution cameras such as 8K cameras support much higher number of pixels such as 8192×4320 pixels [https: www.usa.canon.com/internet/portal/us/home/products/details/cameras/eos-dslr-and-mirrorless-cameras/dslr/eos-5ds-r].

Since FFT's work best with powers of 2, let us assume a size of 4096×4096 pixels. When NA=0.2 and the DFT (image) size is 16384×16384, a 4096×4096 window of DFT spectral points fits right in to the CTF circle with radius $f_C$ equal to $1.257 \cdot 10^6$ m$^{-1}$. In this case, for K×K number of plane waves needed to modulate the input wave, we get K=16384/4096=4. In other words, this system would achieve superresolution with 16384×16384 pixels. By using all K×K plane waves, the amplitudes at 16384×16384 pixels are obtained with each input mask. The rest is processing with iterative phase recovery method iterations.

Masks

A major consideration is how many masks are needed for an iterative phase recovery method to result in acceptable performance. Since each mask means another set of measurements, the fewer masks the better. In addition, the masks used seriously affect the quality of information reconstruction. Recovery of information can be considered in terms of input image amplitude recovery, phase recovery, or preferably both. This is different from phase recovery in the spectral domain. In other words, recovered phase in the spectral domain may give correct input image amplitude recovery, but not necessarily correct input image phase recovery or incomplete input image phase recovery. In the literature, what is usually reported is the input (wave) amplitude recovery. It is highly probable that the recovered input (wave) phase is not sufficiently correct. In accordance with embodiments of the present invention, complete input image amplitude recovery as well as input phase recovery is sought.

Another consideration is type of masks to be used. Reducing the number of masks is achievable in accordance with embodiments of the present invention. As explained above, in the first category, the first mask is a unity (clear, transparent, with all elements equal to +1) mask. The second mask can be (1) a phase mask with phase changing between 0 and $2\pi$ radians, (2) a quantized phase mask with elements equal to quantized phase values, (3) a bipolar binary mask with elements equal to +1 and −1, corresponding to quantized phases chosen as 0 and pi radians, (4) a pair of complementary masks, wherein corresponding elements of each mask in the pair are complementary with respect to amplitude. In the second category, the transparent mask is not required, rather, there are pairs of complementary binary masks, preferably two or more pairs. In particular, two pair of complementary unipolar (+1 and 0) binary masks can be used. If more number of masks are used, the number of phase recovery iterations may be reduced.

Embodiments of the present invention implement iterative phase recovery (version 1) with a unity mask in addition to one or more additional masks, or (version 2) pairs of unipolar masks complementary with respect to amplitude.

The unipolar binary mask is no longer a phase mask, but a binary amplitude mask. According to conventional thinking, amplitude masks do not work in general. On the other hand, unipolar binary masks would be desirable in many applications since they make implementation easier. In accordance with embodiments of the invention, unipolar binary masks are created in pairs. The second mask is the complement of the first mask. In other words to create the second mask, 0's and 1's are exchanged at every component of the first mask. This is also the case with pairs of unipolar binary masks in which 1's are replaced by phase factors whose amplitudes equal 1.

Figure 4:
FIG. 4 is a binary spatial mask when the aperture size is 16×16 pixels.
Figure 5:
FIG. 5 is a binary spatial mask when the aperture size is 8×8 pixels.

Each element in the masks has a finite size. So it is important, especially with optical implementations, that finite sized elements do not reduce performance. We claim that the iterative phase recovery methods function well with finite element sizes as well provided that they are sufficiently small. Sufficiently small is 16×16 in the binary bipolar case and 8×8 in the unipolar binary case. A binary mask for aperture size equal to 16×16 pixels is shown in FIG. 4. A binary mask with an aperture size equal to 8×8 pixels is shown in FIG. 5.

Experimental Results with Complex Waves Using the Proposed Masks

Figure 6:
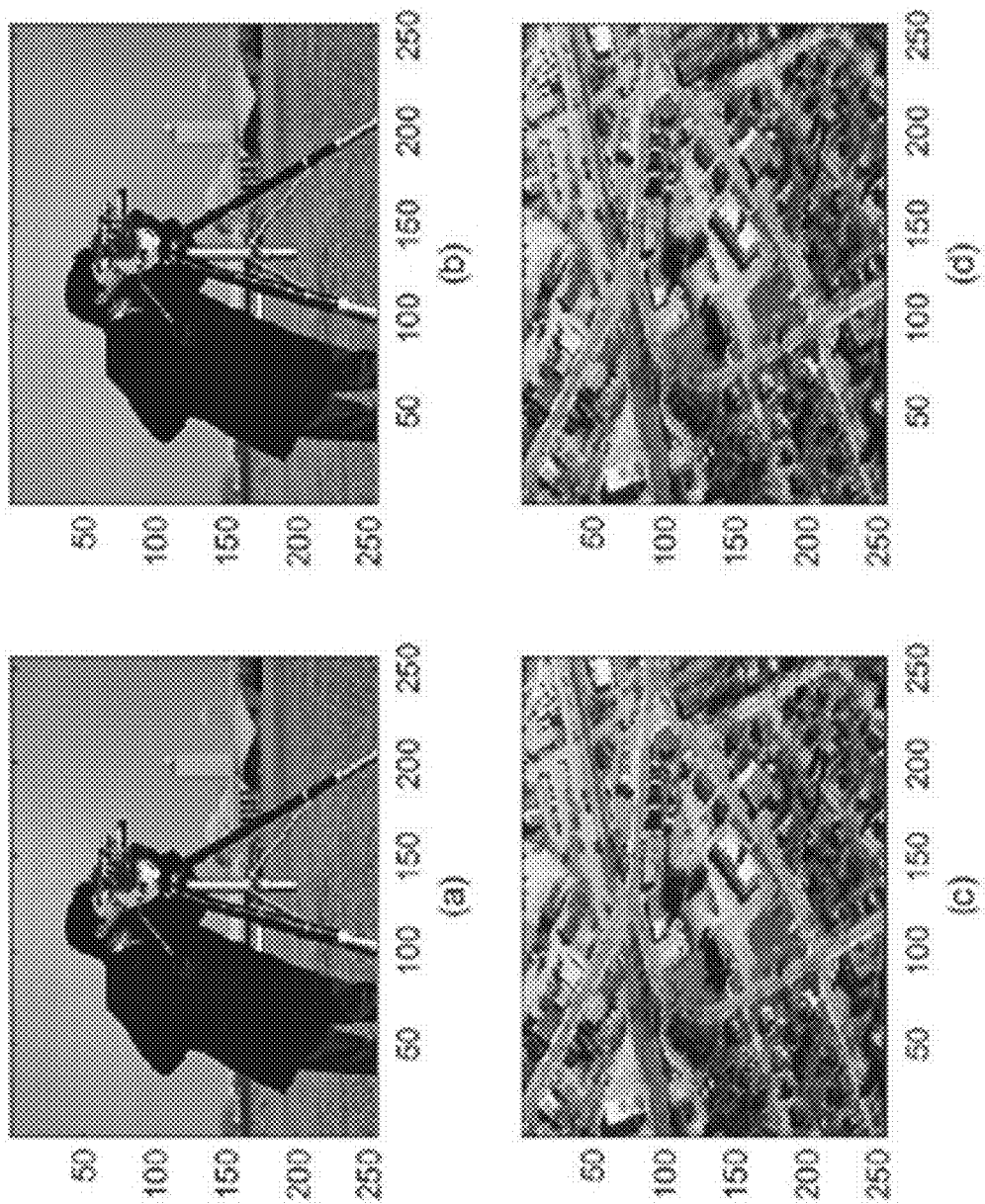
FIG. 6 shows the reconstruction results using G2 with one unity mask and one bipolar binary mask.
Figure 7:
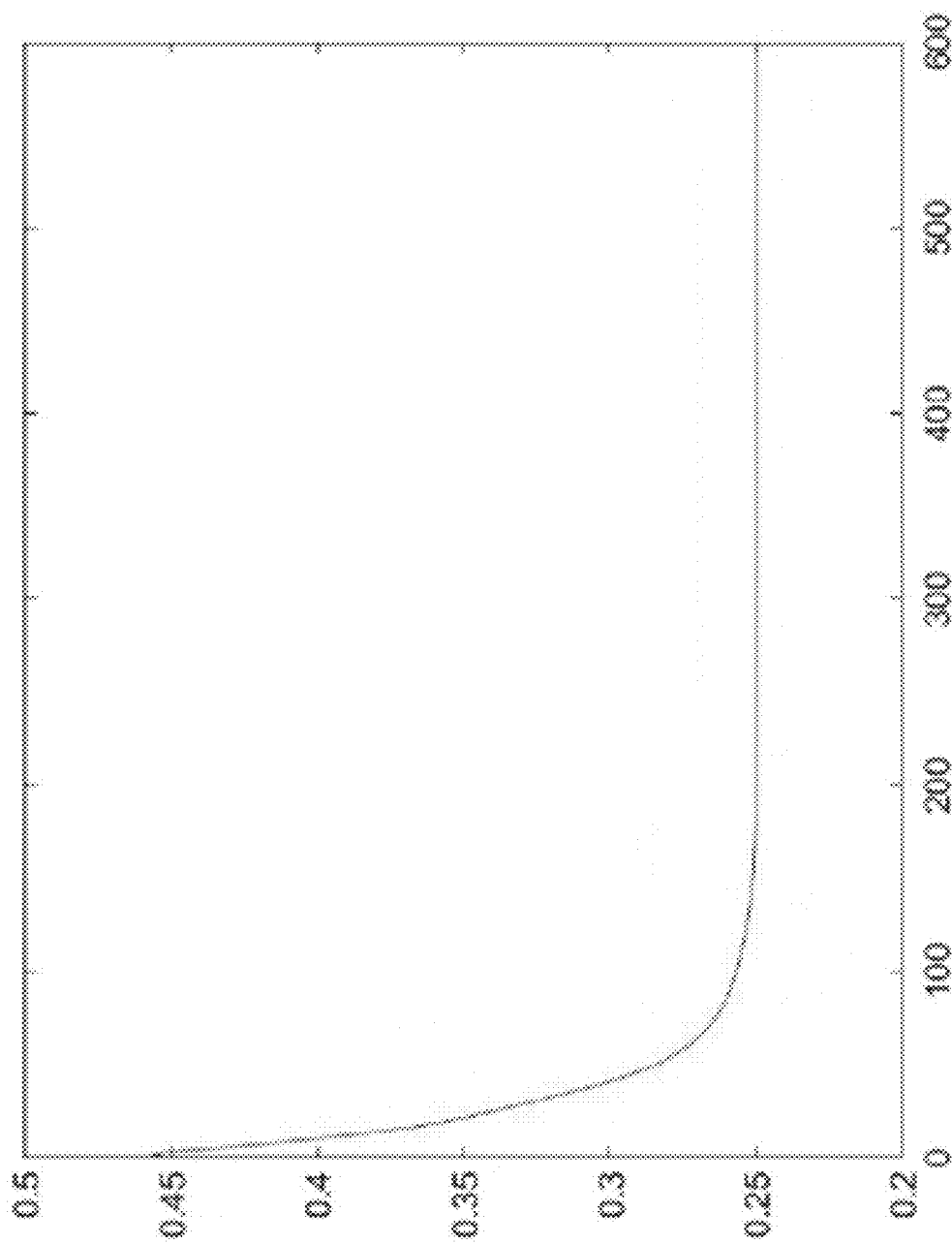
FIG. 7 shows the error reduction curve with one unity mask and one bipolar binary mask when the aperture size is 16×16 pixels.
Figure 8:
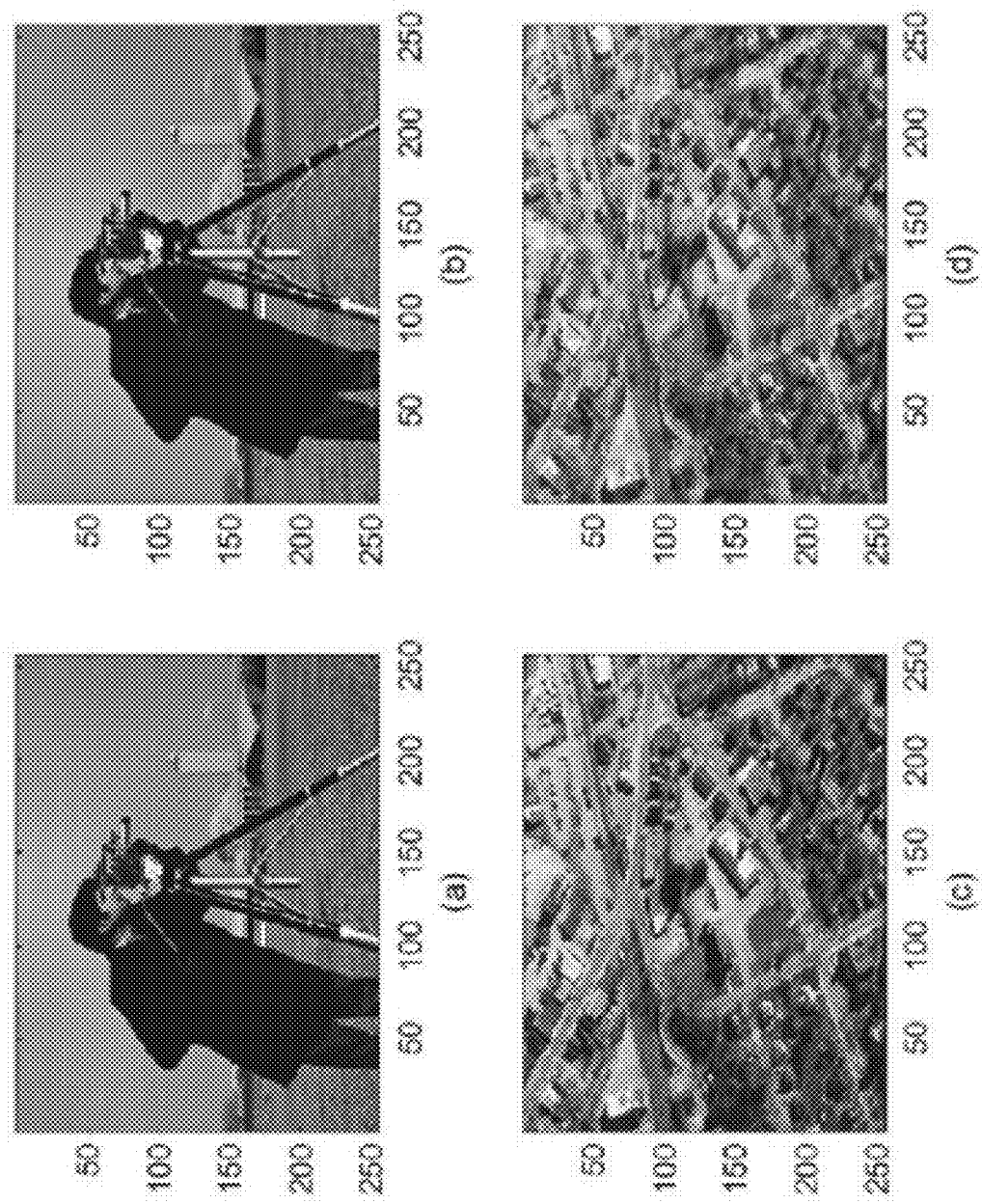
FIG. 8 shows reconstruction results using G2 with one pair of complementary unipolar binary masks.

Some experimental results are provided with a complex wave having amplitude (image) and phase (image) in FIGS. 6, 7, and 8. FIG. 6 shows the reconstruction results with a complex wave using G2 when one unity mask and one bipolar binary mask is used. The original amplitude image is shown at (a). The reconstructed amplitude image is shown at (b). The original phase image is shown at (c). The reconstructed phase image is shown at (d). FIG. 7 shows the corresponding error reduction curve during iterations.

FIG. 8 shows the reconstruction results with the same complex wave using G2 when one pair of complementary unipolar binary masks is used. The original amplitude image is shown at (a). The reconstructed amplitude image is shown at (b). The original phase image is shown at (c). The reconstructed phase image is shown at (d).

Imaging of Distant Objects

In this section, we discuss iterative phase recovery for coherent imaging of objects which are considerably distant from the imaging lens system. In such a case, the field at the entrance of the imaging lens system is directly related to the Fourier transform of the wave coming from a thin object to be imaged. This is especially true in the Fraunhofer approximation for distant wave propagation, and can also be extended to not so distant propagation with Fresnel approximation in the following references: A. Eguchi, J. Brewer, T. D. Milster, "Optimization of random phase diversity for adaptive optics using an LCoS spatial light modulator," *Optics Letters*, Vol. 44, No. 21, 1 Nov. 2019, pp. 6834-6840, and A. Eguchi, T. D. Milster, "Single shot phase retrieval with complex diversity," *Optics Letters*, Vol. 44, No. 21, 1 Nov. 2019, pp. 5108-5111. Fresnel and Fraunhofer approximations of the scalar diffraction integral allow simpler Fourier integral computations to be used for wave propagation. They also allow different input and output plane window sizes. However, they are valid only in certain regions, not very close to the input aperture plane. The Rayleigh-Sommerfeld region is observed to be the entire half-space to the right of the input diffraction plane. The Fresnel and Fraunhofer regions are parts of the Rayleigh- Sommerfeld region. The term far field usually refers to the Fraunhofer region. The term near field can be considered to be the region between the input diffraction plane and the Fraunhofer region.

In previous sections, the input to the lens system was the complex image. Now it is essentially a spectral image. We can consider passing the input wave through the input masks as done previously, followed by another generalized Fourier transform, for example by a lens, which would yield the object image inverted. Then, a camera would record the image. In this geometry, the system is the opposite of the previous systems, meaning the input plane and the spectral plane are exchanged. Unfortunately, iterative phase recovery may not function well under these conditions. The Fourier transform of the object image is usually concentrated at very small frequencies, and the remainder of the Fourier plane information is noiselike with small components, making the use of input masks ineffective.

To address these issues, the system shown in FIG. 1B-II can be used for coherent imaging of thin distant objects. As shown, the lens system may be designed for providing two Fourier transforms rather than one Fourier transform. The first Fourier transform 107 converts the input image (wave) to another image (wave). Then, the previous system is used. The input is passed through splitter(s) whose outputs are sent to the masks as before. The second Fourier transform 110 regenerates the modified spectral information due to masking for illuminating the image sensor 112. Thus, the part denoted by the lens system input plane including masks and the image sensor plane is the same as the system used previously.

Iterative Phase Recovery Methods with Masking

A number of iterative phase recovery methods have been used with masking. According to embodiments of the present invention, using a unity (clear) mask as one of the masks considerably improves the performance of the iterative phase recovery methods when using bipolar binary masks or phase masks. Also, the use of pairs of complementary binary masks in such systems (possibly without unity mask) are highly effective.

Figure 9A:
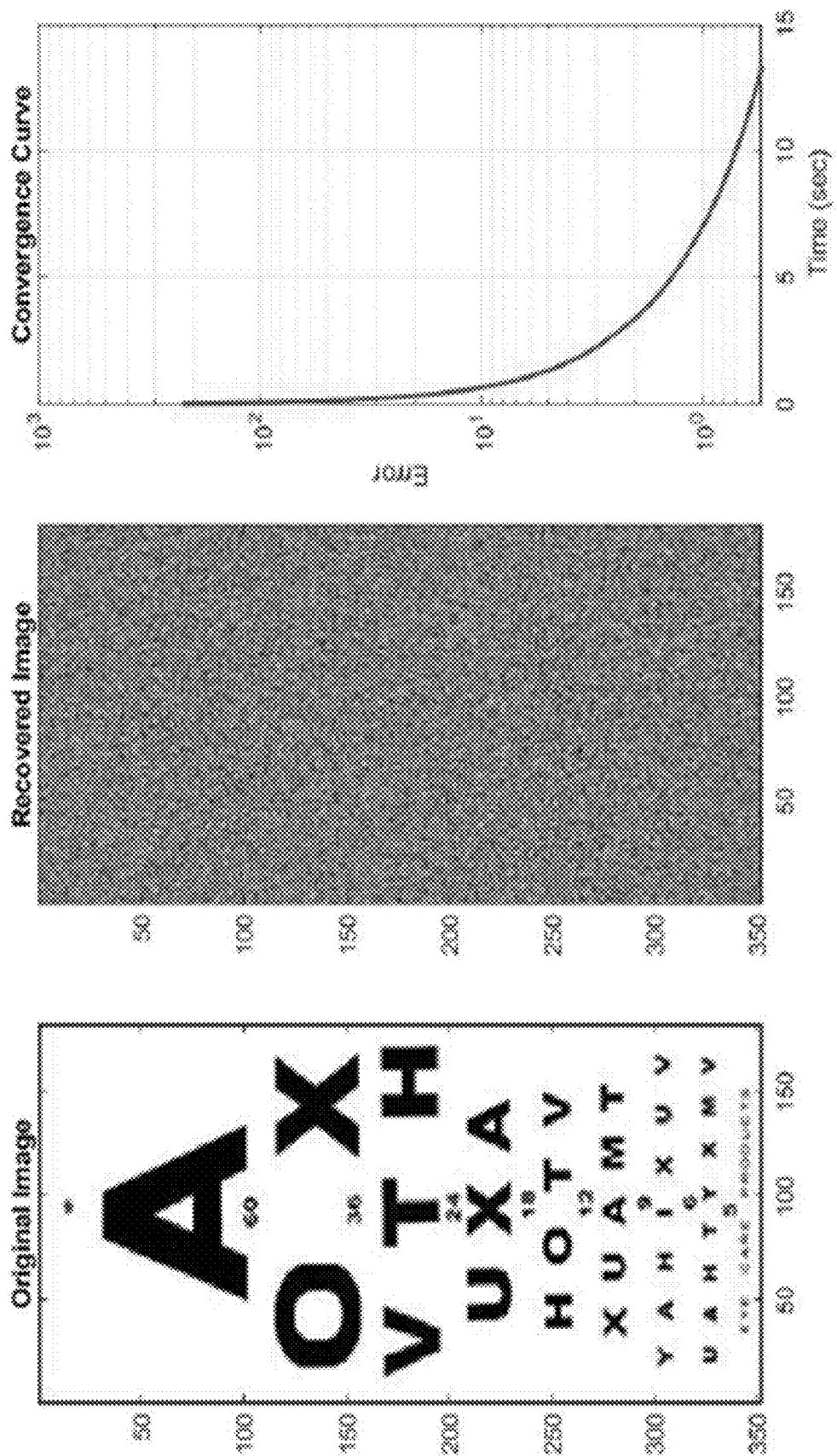
FIG. 9A shows the reconstruction results using 2 bipolar binary masks with the Fienup iterative phase recovery method.
Figure 9B:
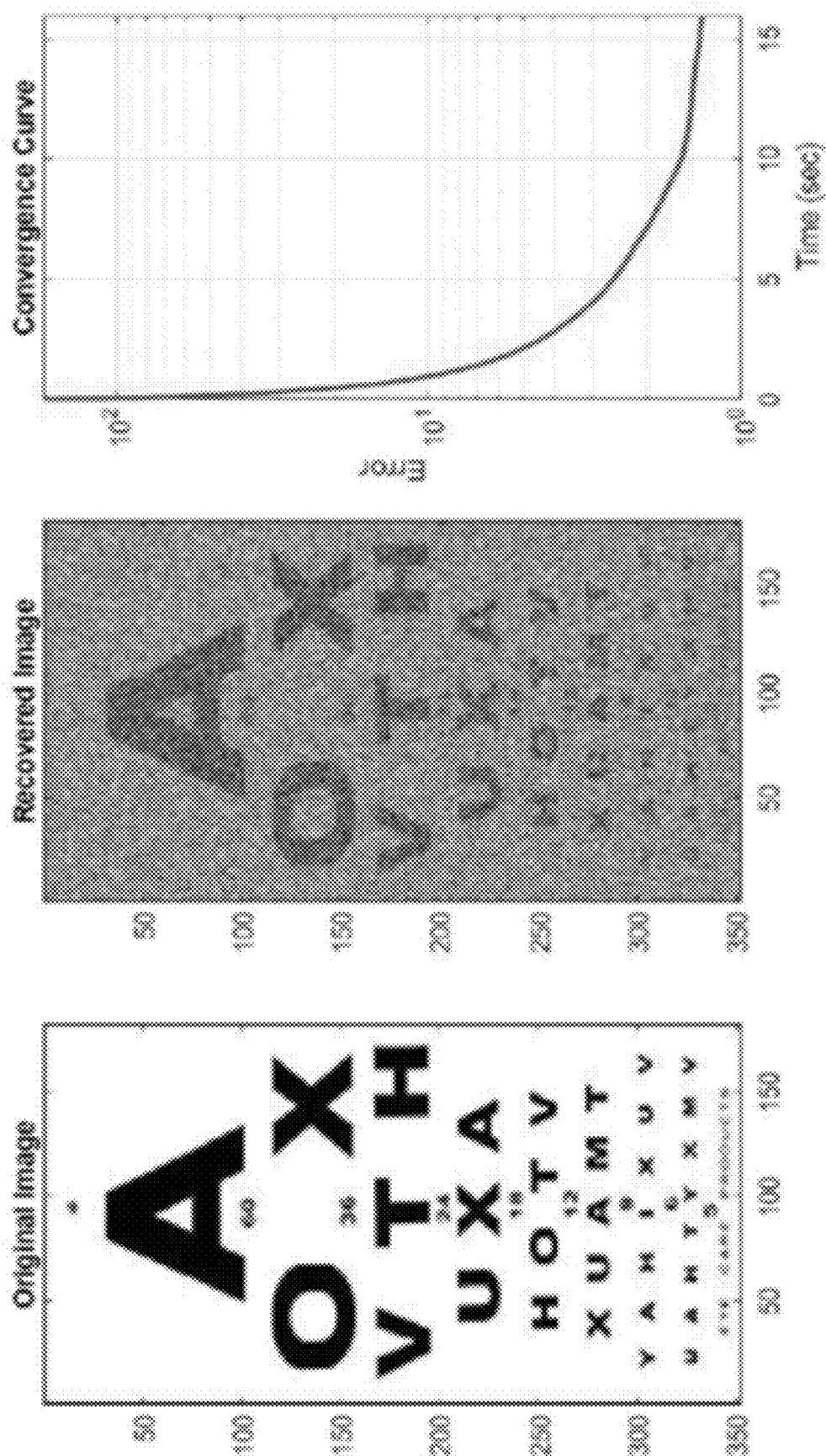
FIG. 9B shows the reconstruction results using 3 bipolar binary masks with the Fienup iterative phase recovery method.
Figure 10:
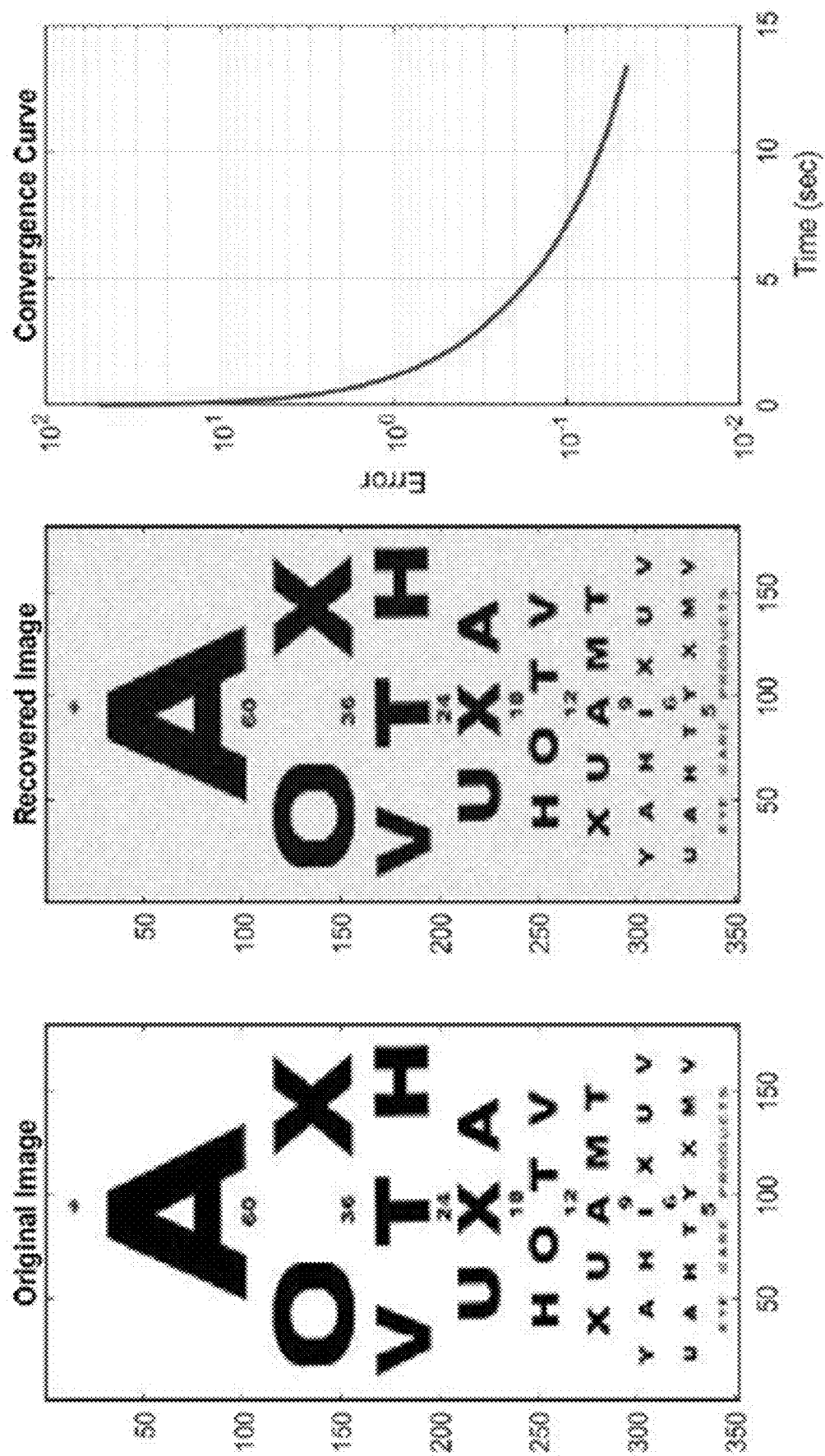
FIG. 10 shows the reconstruction results of an embodiment of the invention using one unity mask and one bipolar binary mask with the Fienup iterative phase recovery method.

The effectiveness of an embodiment of the invention was evaluated digitally. A simple FFT system was used with the digitally implemented masks without borders. Without losing generality, the coherent input was an amplitude image only, meaning the input phase is assumed to be zero at each pixel. FIG. 9A shows image recovery with the Fienup method when 2 bipolar binary masks were used. It is observed that the image is not recovered. The corresponding results with all the other methods were the same. The results were somewhat improved when using 3 bipolar binary masks. This is shown in FIG. 9B with the Fienup method. However, the results are still not satisfactory. Replacing one bipolar binary mask with a clear mask resulted in drastic improvement as shown in FIG. 10 where one clear mask and one bipolar binary mask resulted in image recovery.

Figure 11:
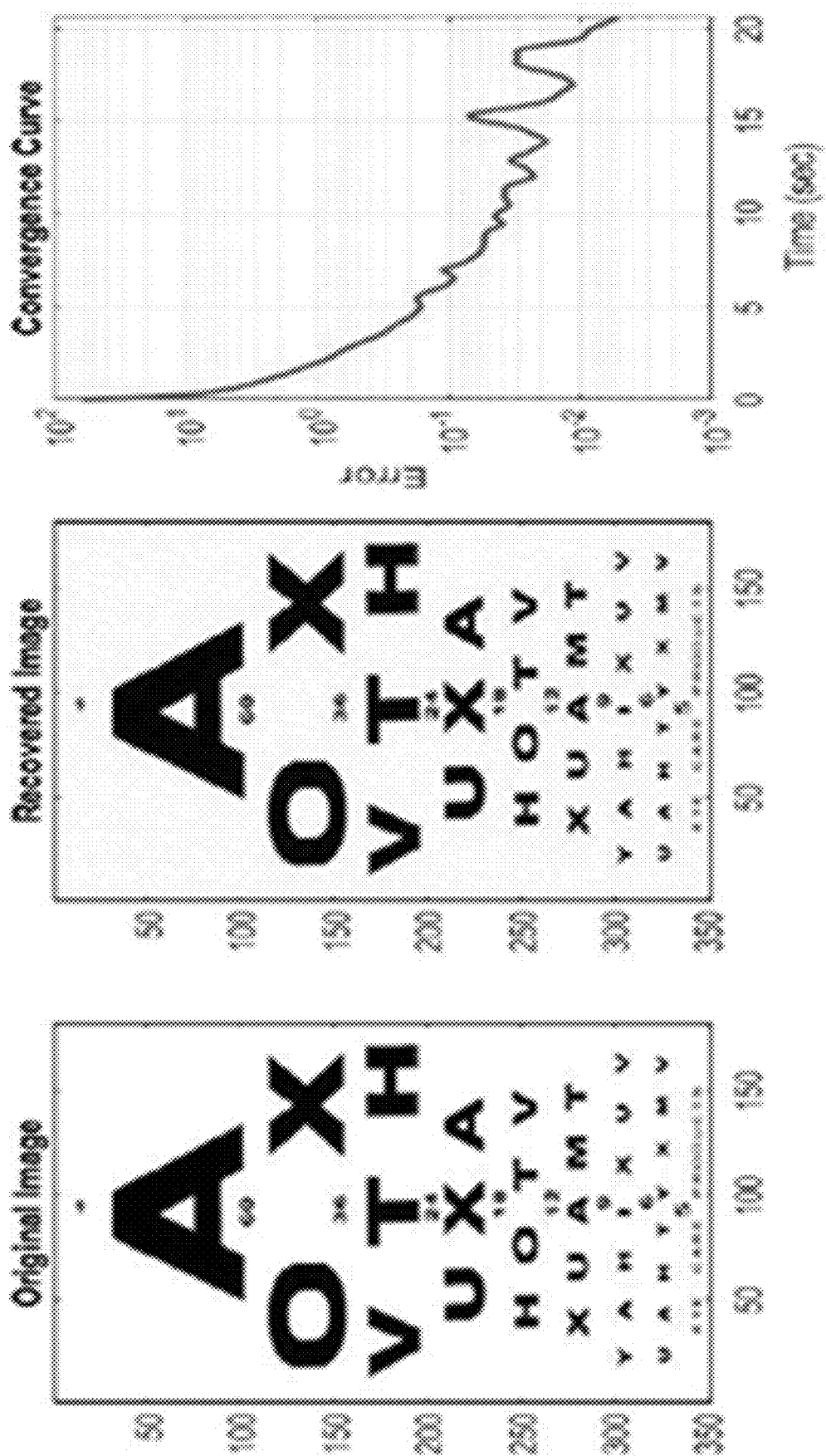
FIG. 11 is the reconstruction results of an embodiment of the invention using two pairs of complementary unipolar binary masks with the Fienup iterative phase recovery method.

The results with pairs of complementary unipolar binary masks showed that they are self-sufficient without a unity mask. FIG. 11 shows image recovery results with two pairs of complementary unipolar binary masks using the Fienup method. It is observed that 2 pairs of complementary masks produced better results than one pair of complementary masks. Beyond two pairs of masks, the results further improve marginally.

With other iterative phase recovery methods, the performance was very similar. Such methods include but are not limited to those listed in Table 1.

TABLE 1

Iterative Phase Recovery Methods.

| Method | Reference |
|---|---|
| WirtFlow (Wirtinger Flow Algorithm) | E. J. Candes, Y. Eldar, T. Strohmer, V, Voroninski, "Phase Retrieval via Matrix Completion," SIAM review, 57(2):225-251, 2015 |
| TWF (Truncated Wirtinger Flow Algorithm (with Poisson loss)) | Yuxin Chen and Emmanuel J Candes, "Solving random quadratic systems of equations is nearly as easy as solving linear systems," https://arxiv.org/abs/1505.05114, 2015 |
| RWF (Reweighted Wirtinger Flow Algorithm) | Ziyang Yuan and Hongxia Wang, "Phase retrieval via reweighted wirtinger flow,"" Appl. Opt., 56(9):2418-2427, Mar 2017 |
| AmplitudeFlow (Amplitude Flow Algorithm without truncation) | Gang Wang, Georgios B Giannakis, and Yonina C Eldar, "Solving systems of random quadratic equations via truncated amplitude flow," arXiv preprint arXiv:1605.08285, 2016 |
| TAF (Truncated Amplitude Flow Algorithm) | Gang Wang, Georgios B Giannakis, and Yonina C Eldar, "Solving systems of random quadratic equations via truncated amplitude flow," arXiv preprint arXiv:1605.08285, 2016 |
| RAF (Re-Weighted Amplitude Flow Algorithm) | G. Wang, G. B. Giannakis, Y. Saad, and J. Chen, "Solving Almost all Systems of Random Quadratic Equations," ArXiv e-prints, May 2017 |
| GerchbergSaxton (Gerchberg Saxton Algorithm) | R. W. Gerchberg, W. O. Saxton, "A practical algorithm for the determination of the phase from image and diffraction plane pictures," Optik, Vol. 35, pp. 237-246, 1972; R. W. Gerchberg, "A New Approach to Phase Retrieval of a Wave Front," Journal of Modern Optics, 49:7, 1185-1196, 2002 |
| Fienup Algorithm | J. R. Fienup, "Phase retrieval algorithms, a comparison," Applied Optics, Vol. 21, No. 15, pp. 2758-2769, 1 August, 1982 |
| Kaczmarz Algorithm | Ke Wei, "Solving systems of phaseless equations via kaczmarz methods: A proof of concept study," Inverse Problems, 31(12):125008, 2015 |
| PhaseMax Algorithm | Sohail Bahmani and Justin Romberg, "Phase retrieval meets statistical learning theory: A flexible convex relaxation," arXiv preprint arXiv: 1610.04210, 2016; Tom Goldstein and Christoph Studer, "Phasemax: Convex phase retrieval via basis pursuit," arXiv preprint arXiv: 1610.07531, 2016 |

Table 2 shows the mean-square error performance with all the methods when using 3 bipolar binary masks versus 1 clear mask and 2 bipolar binary masks. It is observed that the error performances with large MSE error (Fienup, G2, TAF, Wirtflow) with no clear mask substantially improved after replacing one bipolar binary mask with a clear mask.

Table 3 shows how the number of iteration and computation time changes as a function of number pairs of complementary unipolar binary masks with the RAF method, for example. It is observed that the performance gets considerably better in terms of speed of computation as the number of pairs of masks increases to 3 for that method.

Table 4 shows the optimal number of pairs of complementary unipolar masks for best visual performance. This number is 2 (mostly) or 3.

TABLE 2

Error performance with 3 masks.

| Algorithm | MSE Error (no clear mask) | MSE Error (with clear mask) |
| --- | --- | --- |
| TWF | 7.544e−05 | 5.36e−06 |
| Fienup | 1.341 | 9.91e−04 |
| G2 | 1.236 | 9.95e−04 |
| Amplitudeflow | 7.09e−05 | 7.08e−05 |
| Kaczmarz | 0.1965 | 0.134 |
| Phasemax | 2.296e+06 | 3.39e+05 |
| RAF | 7.25e−04 | 2.49e−04 |
| RWF | 4.84e−04 | 4.09e−04 |
| TAF | 0.0226 | 5.37e−05 |
| Wirtflow | 0.0199 | 2.1e−04 |

TABLE 3

Properties as a Function of Pairs of Complementary Unipolar Masks with the RAF method.

| Number of Mask Pairs | 1 | 2 | 3 | 4 |
| --- | --- | --- | --- | --- |
| Number of Iterations | 106 | 49 | 22 | 17 |
| Computation Time (sec) | 12.32 | 8.72 | 7.25 | 7.26 |

TABLE 4

Optimal Number of Pairs of Complementary Unipolar Masks.

| Algorithm | Optimal Number |
| --- | --- |
| TWF | 2 |
| Fienup | 2 |
| G2 | 2 |
| Amplitudeflow | 2 |
| Kaczmarz | 3 |
| Phasemax | 2 |
| RAF | 3 |
| RWF | 1 |
| TAF | 3 |
| Wirtflow | 1 |

Using a Reference Wave

Figure 12A:
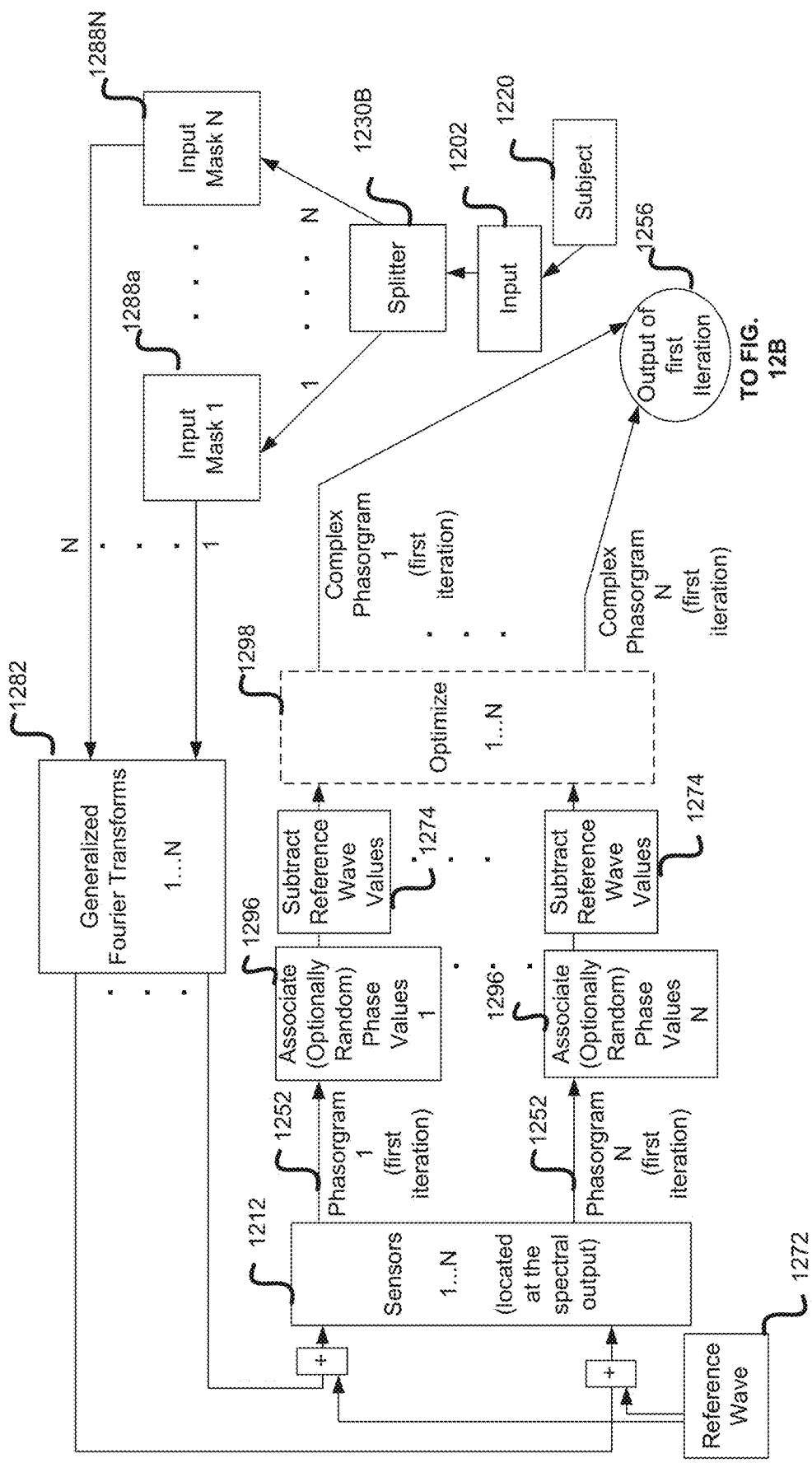
FIGS. 12A and 12B are a flow diagram of a method of phase recovery adding a reference wave.

A first step of an iterative process using a reference wave is illustrated in FIG. 12. The input 1202 is a coherent input wave emanating from the subject 1220. The input 1202 may be an input wave having amplitude and phase. As illustrated in FIG. 12A the input wave emanates through a splitter and is applied to a plurality of masks. In other embodiments, the input wave may travel through the masks sequentially, as described above. The input 1202 is applied to a plurality of masks 1288a-1288N. In some embodiments input mask 1288a is a transparent mask, alternatively referred to as a unity mask. A transparent mask may be an opaque frame with a transparent inside. The other one or more masks may be a complex phase mask. The complex phase mask may be a bipolar binary mask. In one embodiment at least three masks are used including a unity mask and a pair of complementary unipolar binary masks. The masks may be implemented in real time by optical devices. The optical devices may be spatial light modulators and/or micromirror arrays. If at least one beam splitter is used, the masks may be generated on a photographic film or plate.

As the coherent input wave passes through the masks 1288, each mask generated a modified input. Each modified input is then sent through a transformation unit. In embodiments processed physically, the transformation unit may be a lens or lens system, and in embodiments processed digitally, the transformation unit may be a generalized Fourier transform 1282. The result of the transformation unit for each modified input is a transformed modified input at the output plane.

After passing through the lenses, a reference wave 1272 is added to each transformed modified input to produce a combined wave from each of the transformed modified inputs. In some embodiments, the reference wave will be eliminated at the output space to allow for reconstruction of only desired information. Therefore, in such an embodiment, through each processing iteration the reference wave will be both included before sensing and eliminated after sensing and the initial recorded amplitude is used. Consequently, the type of reference wave is not critical providing it has sufficient amplitude that, when added to the input wave, allows for recording of intensity of the total wave.

In a preferred embodiment, the reference wave is combined on-axis with the transformed modified inputs. A reference wave on-axis is substantially parallel to the transformed modified input. Having the constant amplitude, zero phase reference wave on-axis allows for easier implementation. If the reference wave is angled with non-zero linear phase, the reference wave is more difficult to control with precisely known amplitude and phase values at each pixel.

In one embodiment, the reference wave's amplitude must be set to a sufficient amplitude to provide a picture of sufficient quality. In some embodiments, the sufficient amplitude of the reference wave can be determined on a case by case basis, for example, if the resultant totagram or image are not of the quality expected, the amplitude of the reference wave is adjusted until the quality increases. The required amplitude of the reference wave may also change based on which Fourier transformation approximation is used, for example, Fresnel versus Fraunhofer approximations.

A high amplitude reference wave, relative to the input wave, allows the phasorgram to be biased toward the phase angle of the reference wave. This is shown through simple vector addition, if the amplitude of the reference wave is significantly high enough the angle of the input wave phase will have minimal effect on the phasorgram which is a combination of the two waves. This prevents phase wrapping by keeping the change in angle of the combination phasorgram low, as the reference wave limits the change in phasorgram angle.

Sensor system 1212 detects the amplitude of the input wave and reference wave combination. In an embodiment where the wave is processed by the masks serially, only one camera is required to receive the combined reference wave and transformed modified input. A shutter may be used as the masks are switched out. The shutter can stop the input wave in time, allowing the wave to pass serially through each mask. In an embodiment where the waves are processed in parallel, a splitter may send a copy of the wave to each different mask, and a camera is provided for each mask. In both embodiments, the masks may be created from a photographic film or plate.

If the reference wave is on axis, it will have added an amplitude value at each pixel in the output plane. If the reference wave is off axis, it will have included an amplitude value and a phase value at each pixel in the output plane. In some embodiments, the sensors are cameras located at the spectral output. For each input mask 1288, the sensors produce a phasorgram 1252 comprised of an amplitude at each point in the output plane. Processing of each phasorgram begins by associating a phase value with each point. In a preferred embodiment, the phase values are randomly chosen. The values of the reference wave are then subtracted. The results may then be optionally put through an optimization process 1298. Since phase values have been added to each phasorgram, the resultant phasorgrams are complex.

Figure 12B:
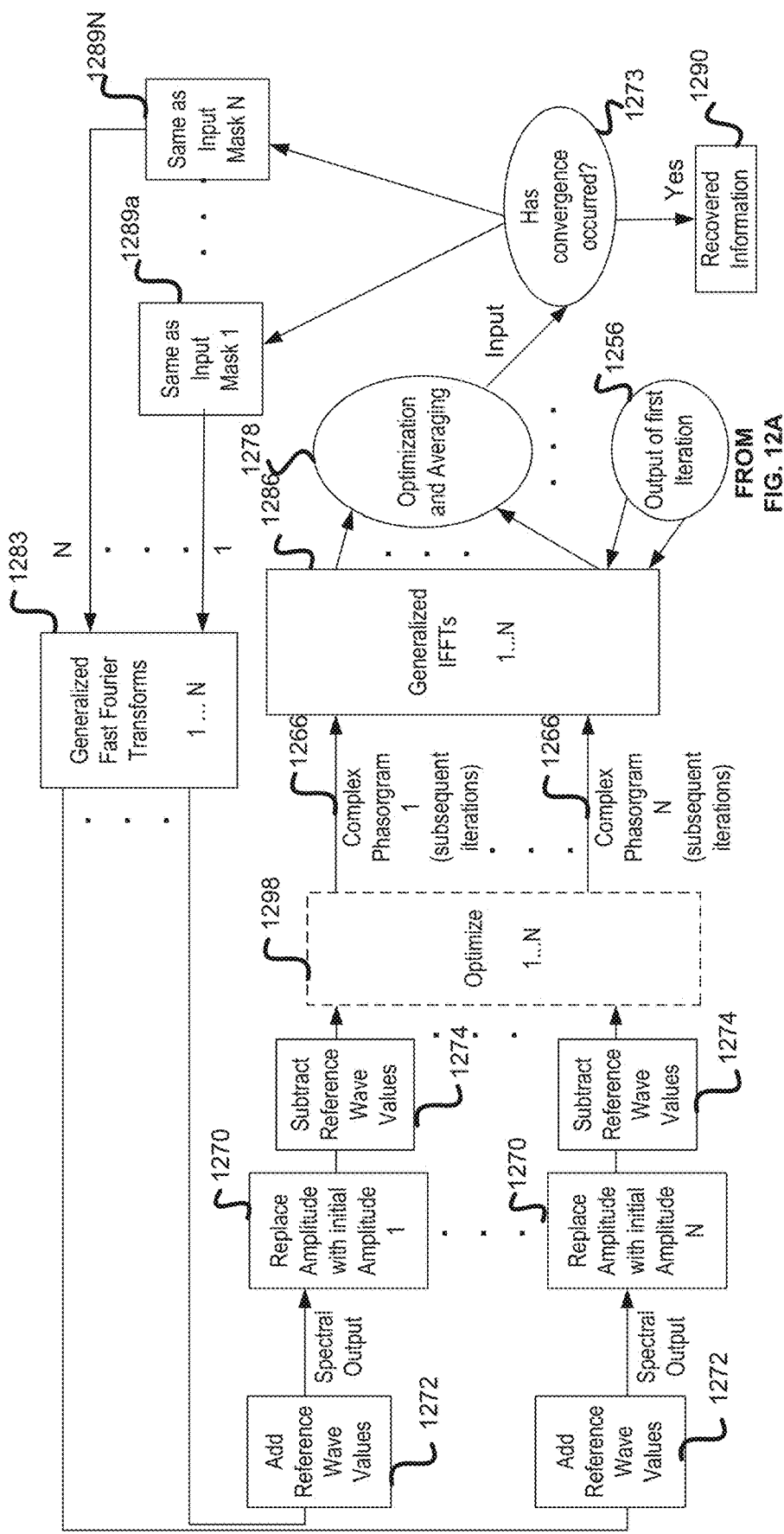

Referring now to FIG. 12B, the resultant complex phasorgrams 1256 are run through a generalized inverse fast Fourier transform 1286. The outputs of the inverse generalized Fourier transform is optionally optimized depending on the process implemented and then the complex information at each corresponding point is averaged 178 to produce a single estimate of the input. In step 1273, the waves are checked to see if the phases have converged or if the maximum number of iterations have been used. If they have converged, the phase has been successfully recovered 1290. If the phases have not converged a new iteration is started, digitally replicating the original iteration done in FIG. 12A.

The iterative process of FIG. 12B passes the single estimate of the input through digital masks 1289a-1289N corresponding identically to the action of the at least two physical masks 1288. A Generalized Fast Fourier transform is performed in step 1283 on each of the intermediate arrays of pixels obtained from the digital masks. A digital representation of the reference wave is then added to the transformed intermediate arrays to get a spectral output. The amplitude values are replaced with the initially recorded amplitude values in 1270. The reference wave values are then subtracted in step 1274 from corresponding points to generate another plurality of complex phasorgrams. The phasorgrams may then be optimized in step 1398. An iFFT is performed on each complex phasorgram, the resultant waveforms may then be optimized. The complex information at each point is averaged to check again for convergence. This iterative process continues until convergence of the phases has been reached.

Using Camera Sensors Imaging the Input Plane

Figure 13A:
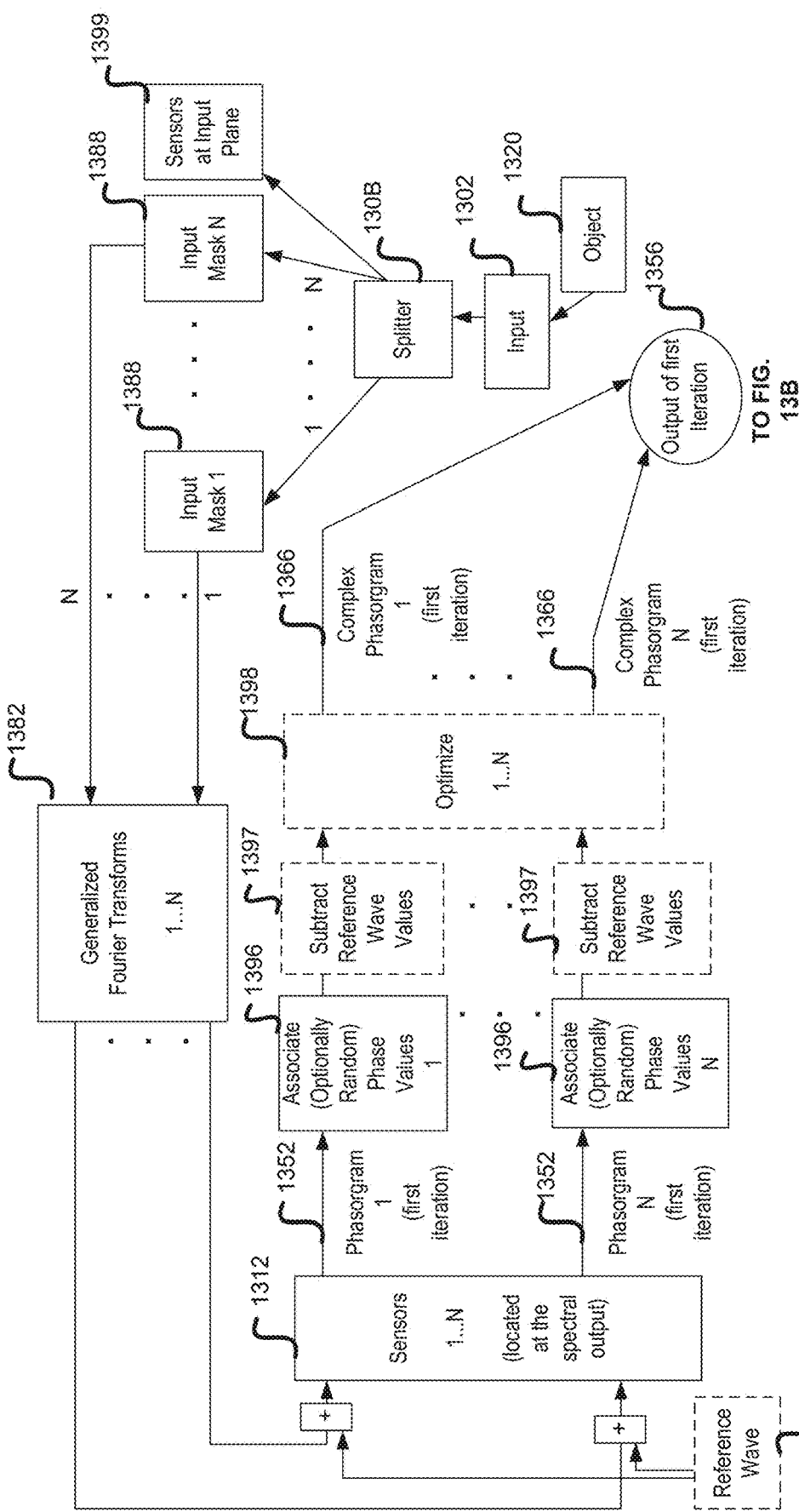
FIGS. 13A and 13B are a flow diagram of a method of phase recovery including a camera at the input plane, in accordance with the present invention.
Figure 13B:
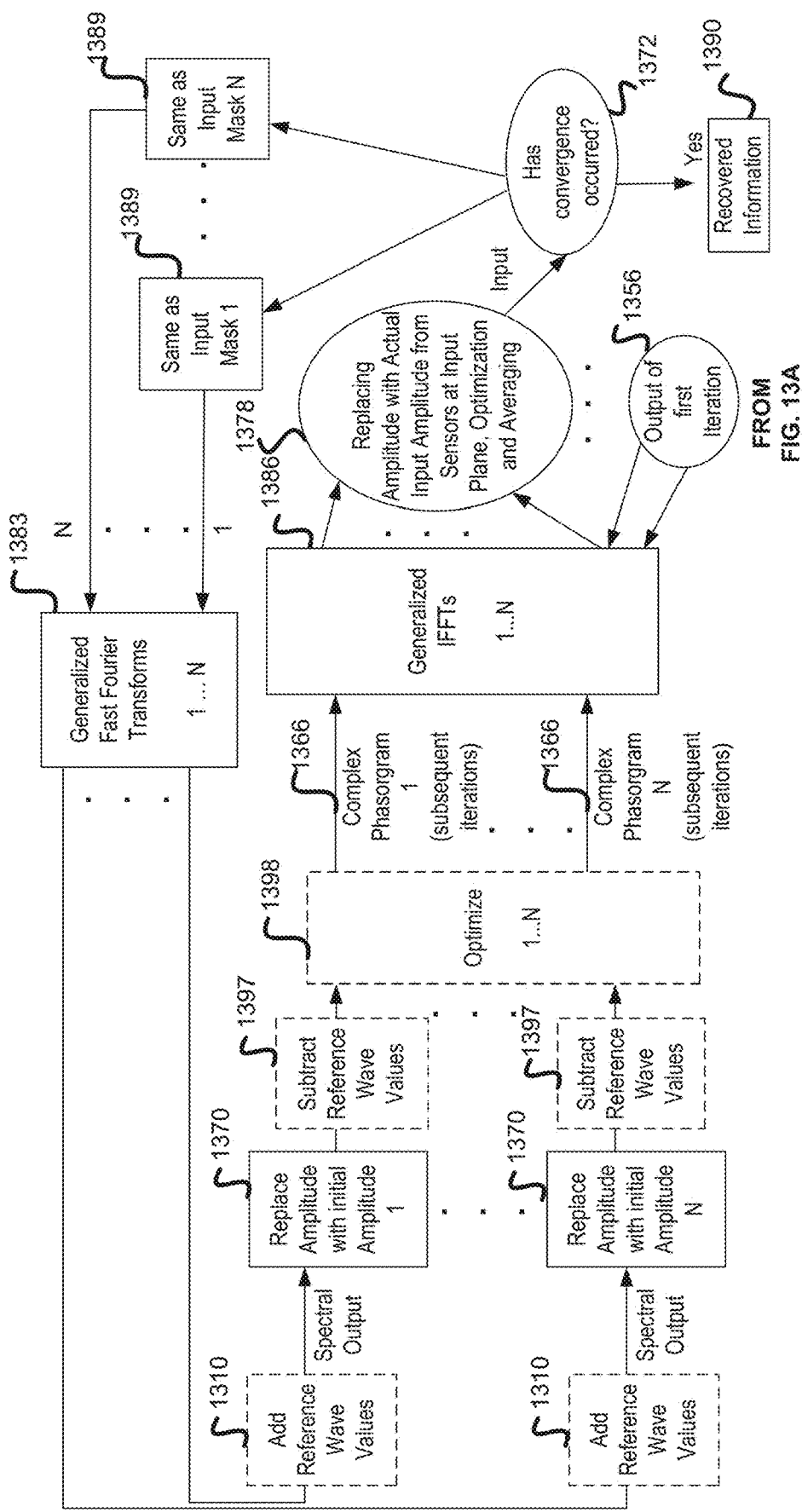

FIGS. 13A and 13B are a flowchart of an iterative process to recover phase of an image using two cameras. The sensors imaging the input plane 1399 detect an array of intensities of the input 1302 which is, typically, a coherent plane wave representative of the subject 1320 observed at the input. In some embodiments, such as the one in FIG. 13A, a splitter duplicated the input 1302 to send a coherent plane wave to the masks 1388 and the first sensor 1399. The masks, in a preferred embodiment, may advantageously be any of the special mask combinations described herein. In particular, the use of two masks, one of which is a unity mask, has been found to be beneficial.

Similarly to the embodiment shown in FIG. 12A, after passing through the masks each modified coherent wave is sent through a transformation unit. In embodiments processed physically, the transformation unit may be a lens or lens system, and in embodiments processed digitally, the transformation unit may be a generalized Fourier transform 1382. Sensor system 1312 detects an array of amplitudes from each of the transformed modified input waves to create a first iteration of phasorgrams 1352. Processing of each phasorgram begins by associating a phase value 1396 with each point to form a complex phasorgram. In a preferred embodiment, the phase values are randomly chosen. Optionally, the embodiment described above can be implemented in which a reference wave 1372 can be added before the modified input is evaluated by the sensors 1312. In this case, the amplitude and any phase of the reference wave is subtracted 1397 from the phasorgram. At this point optimization 1398 may be applied if desired. The resultant complex phasorgram 1366 is sent as output 1356 for the next iteration.

FIG. 13B shows a subsequent digital iteration of determining the phase. The output 1356 obtained from the processing originating from each mask is moved through a generalized inverse fast Fourier transform 1386 and then: (1) the amplitudes are replaced with the array of actual input amplitudes derived from the array of intensities detected by sensor 1399 at the input plane, (2) an optimization is performed if desired, and (3) averaging the values for each point across the arrays of values to determine a single estimate for an array in step 1378. The process then checks for convergence 1372 and if convergence is achieved information is recovered 1390. If convergence is not achieved, a new iteration is started again digitally replicating the original iteration done in FIG. 13A.

The iterative process of FIG. 13B passes the single estimate of the input through digital masks 1389 which correspond identically to the action of the at least two physical masks 1388. A Generalized Fast Fourier transform is performed in step 1383 on each of the intermediate arrays of pixels obtained from the digital masks. The amplitude values are replaced with the amplitude values 1370 that were initially recorded by sensors 1312 at the output plane. If a reference wave is added 1310, a digital representation of the reference wave is added to the transformed intermediate arrays to get a spectral output, and later, after the amplitude replacement, are subtracted from corresponding points to generate another plurality of complex phasorgrams.

The phasorgrams may then be optimized in step 1398 creating subsequent iterations of complex phasorgrams 1366. An iFFT is performed on each complex phasorgram 1366, the resultant waveforms may have their amplitudes replaced with the originally sensed amplitudes of sensor 1399 and the waveforms are optimized. The complex phasorgram at each point is averaged to check again for convergence. This iterative process continues until convergence of the phases has been reached and thus the information has been recovered.

For various embodiments, two schemes are considered at the system input. In the first scheme, the average wave at the input is computed the same way as shown in FIGS. 12A and 12B. Then, the amplitude of the average wave is replaced by the known input amplitude. This scheme works well with the Fraunhofer and Fresnel approximations. In the second scheme, before the computation of the average wave at the input, the amplitude of each wave after modified by each input mask used is replaced with the known input amplitude, followed by the computation of the average wave. This scheme works well with the angular spectrum method.

As an example of the numerical process at one of the pixels for when a reference wave is used, the reference wave amplitude is A with a phase angle of 0 and the input wave has an amplitude of B with a phase angle of a. The camera senses amplitude C, but cannot sense a phase angle.

$$Ce^{j\gamma} = Ae^{j0} + Be^{j\alpha}$$

However, since the camera cannot sense the phase angle, the $\gamma$ is lost. In the first iteration $Ce^{j\beta}$ is generated where $\beta$ is random. The reference wave is then subtracted.

$$Ce^{j\beta} - Ae^{j0} = De^{j\mu}$$

The next iteration is then run using $De^{j\mu}$ which generates $C'e^{j\beta'}$ as the spectral output. Since the correct amplitude of C is known, C' is replaced by C to re-generate $Ce^{j\beta}$ wherein for each iteration $\beta$ will, in general, approach $\gamma$. After the inverse Fourier transform is performed, the values of the computed phase angles for each of the masks are compared to one another to check for convergence. When the value of the calculated phase angles are within a threshold, or the maximum number of iterations is reached, one may assume, with high enough certainty, that the phase has been recovered.

The key feature of totography with a reference wave is the inclusion of the reference wave for the camera recording of the total wave which is the sum of the output object wave and the reference wave, and the immediate subtraction of the known reference wave after recording and fixing the amplitude as the initial amplitude at each pixel. The iterations for phase recovery are carried out with the same feature of adding and subtracting the reference wave at each iteration. At convergence, only the amplitude and phase images of the object wave are obtained without the detrimental effects of the reference wave such as the twin image, background wave components and speckle. The reference wave inclusion also allows the elimination of phase wrapping problems.

Concluding Remarks

Iterative phase recovery methods can be implemented digitally, for example, within a digital processor, such as a computer. The input may for example be a pre-recorded image or other array of points. In this case, a generalized FFT and generalized inverse FFT (IFFT) can be used. Using the word 'optical' in a general sense to encompass all waves, iterative phase recovery methods can also be implemented by a coherent optical or by a coherent optical/digital system. In these cases, the initial Fourier transform operation and amplitude detection is typically done by a lens/camera system. In the case of a coherent optical/digital system, wave amplitude information obtained by a lens/camera system is input to a computer system to carry out the iterations with FFT and IFFT in accordance with the iterative phase recovery method. This can be followed by possible other operations such as generation of 3-D images.

In a digital implementation, the input masks can be generated within a computer, possibly together with the complex input information. In a coherent optical or coherent optical/digital implementation, they can be implemented in real time by optical devices such as spatial light modulators and micromirror arrays. The masks can also be generated by a photographic film or plate.

Coherent optical systems are at least diffraction limited. This means a lens system acts as a lowpass filter characterized by a numerical aperture NA. Iterative phase recovery functions require that the system NA is sufficiently large. According to embodiments of the present invention, NA≥0.7 was found to be sufficient.

Coherent optical systems have aberrations. They are usually modeled as phase factors on the spectral plane of the system. For example, such modeling can be done in terms of polynomials expressing phase due to aberrations, such as Seidel aberrations and Zernicke polynomials. In a coherent system, aberration Phase factors appear as an additional phase to be added to the input spectral phase on the Fourier plane. The camera is sensitive to amplitude only, eliminating all aberrations which can be modeled as phase variations on the spectral plane. As such, spectral phase aberrations have no detrimental effect on the performance of spectral iterative phase recovery methods.

An optical system with limited NA and aberrations can be used to achieve superresolution by using iterative phase recovery methods and including linear phase modulation with the input information a number of times. The linear phase modulation part is like what is done in synthetic aperture microscopy and Fourier ptychographic imaging. Iterative phase recovery operates with the spectral amplitudes obtained from all the linearly phase modulated parts of input information with each mask to result in superresolved amplitude and phase information. Similar results can be achieved by moving the intensity sensor spatially instead of linear phase modulation after passing the input wave through each of the at least two physical spatial masks a number of times.

The input masks can be produced with elements, for example, elements having a finite size provided that the sizes are sufficiently small. In the case of unipolar binary masks, 8×8 elements or smaller resulted in satisfactory performance in digital experiments. In the case of bipolar binary masks, 16×16 elements or smaller resulted in satisfactory performance in digital experiments. Thus, the bipolar binary masks are more tolerant than unipolar binary masks. In either case, use of finite sized elements means simpler implementation.

Iterative phase recovery performs well in noise. Images heavily corrupted by noise can be recovered as they appear in noise. Further denoising can be used to generate clear images.

Coherent distant object imaging can be done with iterative phase recovery processing. Here the input image (wave) is already Fourier transformed due to coherent wave propagation and may be compressed. Then, one more Fourier transform generates the decompressed image (wave) information. The rest of the system is the same as what we utilized previously with masks and the iterative process of phase recovery.

When the input is an amplitude image only, phase is zero at each input point. Then excellent results can be achieved without a border region composed of zeros surrounding the input window.

The performance of an iterative phase recovery method is substantially increased by using the claimed methods and systems to reduce the computation time, to reduce the number of masks, to reduce the number of iterations, to increase the quality of reconstruction, and to increase the ease of implementation by using (1) a unity mask together with one or more bipolar binary masks with elements equal to 1 and −1, or (2) a unity mask together with one or more phase masks, or (3) a unity mask together with one pair of masks or more than one pair of masks having binary amplitudes of 0's and 1's, in which the masks in the pair are complementary to each other with respect to amplitude, or (4) one or more pairs of complementary masks with binary amplitudes of 0's and 1's without needing a unity mask. In all cases, it is possible to use outer borders filled with zeros.

Use of borders, for example, by doubling the mask size and filling the outer border of the mask with zeros can improve the result. Using any of these combinations of specially selected masks can increase the quality of reconstruction and simplify implementation.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A method for recovering phase information of an input from a coherent wave, the method comprising:
    providing at least one transformation unit with an input plane and an output plane;
    providing at least two masks one of which is a unity mask, each of the at least two masks configured to be disposed at the input plane;
    providing an optical sensor configured to detect and record an array of coherent wave intensities of the input plane;
    applying the coherent wave at the input plane separately to the optical sensor and to each of the at least two masks to generate a modified input from each of the masks;
    passing the modified inputs through the at least one transformation unit, wherein the at least one transformation unit performs a generalized Fourier transform on each modified input to produce at the output plane a transformed modified input from each modified input;
    recording amplitude values at an array of points derived from each transformed modified input to produce phasorgrams;
    associating a phase value with each point on each phasorgram to form a plurality of complex phasorgrams; and
    iteratively processing the plurality of complex phasorgrams to repeatedly determine a single estimate of the input in which an array of amplitudes derived from the array of recorded coherent wave intensities is used as the amplitudes in determining the single estimate, until convergence is achieved to produce a totagram constituting a reconstructed input with amplitude and phase information.

2. The method of claim 1 wherein each mask includes an outer border that blocks an outer periphery of the coherent wave.

3. The method of claim 1, further comprising switching from one of the at least two masks to another of the at least two masks such that the coherent wave is individually received sequentially in time by each of the at least two masks.

4. The method of claim 1, further comprising splitting the coherent wave so that it is individually received in parallel by each of the at least two masks.

5. The method of claim 1, wherein the at least two masks consist of the unity mask and a complex phase mask.

6. The method of claim 5, wherein the complex phase mask comprises a bipolar binary mask.

7. The method of claim 1, wherein the at least two masks consist of the unity mask and a pair of complementary unipolar binary masks.

8. The method of claim 1, wherein the at least two masks are implemented in real time by optical devices including any of spatial light modulators, and micromirror arrays, and fixed masks.

9. The method of claim 1, wherein recording is performed by an intensity sensor.

10. The method of claim 1, further comprising, after completion, using the totagram to generate a representation of the information embedded in the reconstructed amplitude and phase of the input.

11. The method of claim 1, wherein iteratively processing the plurality of complex phasorgrams comprises:
    (a) processing the plurality of complex phasorgrams to obtain a single estimate of the input wave by performing on the complex phasorgrams an inverse generalized Fourier transform, replacing amplitudes with the amplitudes derived from the array of intensities and averaging complex information at each point at corresponding locations;
    (b) passing the single estimate of the input wave through a process replicating each of the masks to obtain a plurality of intermediate arrays;
    (c) performing a generalized fast Fourier transform on each of the intermediate arrays and replacing amplitude values at each point in the transformed intermediate arrays with corresponding recorded amplitude values to generate a second plurality of complex phasorgrams; and
    (d) repeating step (a) for the second plurality of complex phasorgrams followed by steps (b) and (c) until convergence is achieved, wherein upon completion the single estimate of the input wave is the totagram.

12. The method of claim 1 further comprising the step of combining a reference wave with each transformed modified input to produce a combined wave from each transformed modified input, and wherein the step of recording amplitude values comprises recording amplitude values at an array of points of each combined wave.

13. The method of claim 12 further comprising the step of subtracting the reference wave from each of the complex phasorgrams.

14. The method of claim 1 wherein the transformation unit comprises a lens system and the output plane is a focal plane of the lens system.

15. A system for recovering phase information of an input from a coherent wave comprising:
    a transformation unit having an input plane and an output plane;
    at least two masks one of which is a unity mask, each of the at least two masks being disposed at the input plane of the transformation unit for receiving the coherent wave;
    an optical sensor configured to detect and record an array of coherent wave intensities of the input plane;
    wherein the at least two masks are configured to separately modify the coherent wave, and wherein the transformation unit performs a generalized Fourier transform on each of the separately modified waves to produce a transformed wave from each of the separately modified waves;
    at least one sensor system configured to record amplitude values at an array of points derived from each transformed wave at the output plane to produce a phasorgram from each transformed wave; and
    a digital processor configured to:
    associate a phase value with each point on each phasorgram to form a plurality of complex phasorgrams; and iteratively process the plurality of complex phasorgrams to repeatedly determine a single estimate of the input in which an array of amplitudes derived from the array of recorded coherent wave intensities is used as the amplitudes in determining the single estimate, until convergence is achieved to produce a totagram constituting a reconstructed input with amplitude and phase information.

16. The system of claim 15, wherein the at least two masks consist of the unity mask and a bipolar binary mask.

17. The system of claim 15, wherein the at least two masks consist of the unity mask and a pair of complementary unipolar binary masks.

18. The system of claim 15, wherein each mask is surrounded by an outer border that blocks the coherent wave.

19. The system of claim 15, wherein to iteratively process the plurality of complex phasorgrams comprises
   (a) processing the plurality of complex phasorgrams to obtain a single estimate of the input by performing on the complex phasorgrams an inverse generalized Fourier transform, replacing amplitudes with the amplitudes derived from the array of intensities and averaging complex information at each point at corresponding locations;
   (b) passing the single estimate of the input wave through a process replicating each of the masks to obtain a plurality of intermediate arrays;
   (c) performing a generalized fast Fourier transform on each of the intermediate arrays and replacing amplitude values at each point in the transformed intermediate arrays with corresponding recorded amplitude values to generate a second plurality of complex phasorgrams; and
   (d) repeating step (a) for the second plurality of complex phasorgrams followed by steps (b) and (c) until convergence is achieved, wherein upon completion the single estimate of the input wave is the totagram.

20. The system of claim 19, wherein convergence is determined by any of (1) when the absolute value of a difference between successive single estimates reaches a predetermined threshold, and (2) when a given number of iterations of step (a) is completed.

21. The system of claim 15, wherein the at least two masks are configured so as to switch from one of the at least two masks to another of the at least two masks such that the coherent wave is individually received in sequence by each of the at least two masks.

22. The system of claim 15, further comprising a beam splitter arranged to split the coherent wave so that it is individually received in parallel by each of the at least two physical spatial masks and the optical sensor.

23. The system of claim 15, further comprising a reference wave source and optical means for combining the reference wave with each transformed wave to produce a combined wave from each transformed wave and wherein the at least one sensor system is configured to record amplitude values at an array of points of each combined wave.

24. The system of claim 23, wherein the digital processor is further configured to subtract values of the reference wave from each of the complex phasorgrams.

25. The system of claim 15 wherein the transformation unit comprises a lens system and the output corresponds to a focal plane of the lens system.

* * * * *